US012405546B2

(12) United States Patent
Kototani et al.

(10) Patent No.: US 12,405,546 B2
(45) Date of Patent: Sep. 2, 2025

(54) TONER

(71) Applicant: CANON KABUSHIKI KAISHA, Tokyo (JP)

(72) Inventors: Shohei Kototani, Shizuoka (JP); Takashi Kenmoku, Shizuoka (JP); Noritaka Toyoizumi, Shizuoka (JP); Yoshiaki Shiotari, Shizuoka (JP); Mayumi Inoue, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 782 days.

(21) Appl. No.: 17/502,771

(22) Filed: Oct. 15, 2021

(65) Prior Publication Data

US 2022/0128918 A1 Apr. 28, 2022

(30) Foreign Application Priority Data

Oct. 23, 2020 (JP) ................................ 2020-178438

(51) Int. Cl.

*G03G 9/08* (2006.01)
*G03G 9/087* (2006.01)
*G03G 9/097* (2006.01)

(52) U.S. Cl.

CPC ....... *G03G 9/09775* (2013.01); *G03G 9/0819* (2013.01); *G03G 9/0823* (2013.01); *G03G 9/08711* (2013.01); *G03G 9/08755* (2013.01)

(58) Field of Classification Search

None

See application file for complete search history.

(56) References Cited

U.S. PATENT DOCUMENTS

| | | | |
|---|---|---|---|
| 4,609,607 | A | 9/1986 | Takagi et al. |
| 4,876,169 | A | 10/1989 | Gruber |
| 4,954,404 | A | 9/1990 | Inoue et al. |
| 5,104,763 | A | 4/1992 | Ong |
| 5,401,601 | A | 3/1995 | Sacripante |
| 5,620,783 | A | 4/1997 | Takeuchi et al. |
| 5,639,583 | A | 6/1997 | Takeuchi et al. |
| 5,776,543 | A | 7/1998 | Takeuchi et al. |
| 6,777,153 | B2 | 8/2004 | Yano et al. |
| 6,808,907 | B2 | 10/2004 | Honma et al. |
| 6,908,721 | B2 | 6/2005 | Kenmoku et al. |
| 6,911,520 | B2 | 6/2005 | Fukui et al. |
| 7,045,321 | B2 | 5/2006 | Imamura et al. |
| 7,141,342 | B2 | 11/2006 | Toyoda et al. |
| 7,264,910 | B2 | 9/2007 | Toyoda et al. |
| 7,288,357 | B2 | 10/2007 | Toyoda et al. |
| 7,393,912 | B2 | 7/2008 | Mihara et al. |
| 7,399,568 | B2 | 7/2008 | Fukui et al. |
| 7,408,017 | B2 | 8/2008 | Imamura et al. |
| 7,452,960 | B2 | 11/2008 | Yano et al. |
| 7,510,813 | B2 | 3/2009 | Yano et al. |
| 7,638,194 | B2 | 12/2009 | Fukui et al. |
| 7,638,590 | B2 | 12/2009 | Fukui et al. |
| 7,682,765 | B2 | 3/2010 | Sugawa et al. |
| 7,795,363 | B2 | 9/2010 | Fukui et al. |
| 7,833,685 | B2 | 11/2010 | Tanaka et al. |
| 7,833,687 | B2 | 11/2010 | Kato et al. |
| 7,858,282 | B2 | 12/2010 | Ayaki et al. |
| 7,935,771 | B2 | 5/2011 | Fukui et al. |
| 8,067,136 | B2 | 11/2011 | Yano et al. |
| 8,093,342 | B2 | 1/2012 | Minami et al. |
| 8,110,329 | B2 | 2/2012 | Tominaga et al. |
| 8,178,271 | B2 | 5/2012 | Fukui et al. |
| 8,211,606 | B2 | 7/2012 | Murai et al. |
| 8,288,069 | B2 | 10/2012 | Fujikawa et al. |
| 8,323,726 | B2 | 12/2012 | Naka et al. |
| 8,372,573 | B2 | 2/2013 | Ayaki et al. |
| 8,377,616 | B2 | 2/2013 | Tani et al. |
| 8,383,312 | B2 | 2/2013 | Fujimoto et al. |
| 8,383,313 | B2 | 2/2013 | Ayaki et al. |
| 8,551,680 | B2 | 10/2013 | Ayaki et al. |
| 8,574,801 | B2 | 11/2013 | Itabashi et al. |

(Continued)

FOREIGN PATENT DOCUMENTS

| | | |
|---|---|---|
| CN | 107367912 A | 11/2017 |
| CN | 110083025 A | 8/2019 |

(Continued)

OTHER PUBLICATIONS

U.S. Appl. No. 17/466,306, Kenichi Nakayama, filed Sep. 3, 2021.
U.S. Appl. No. 17/502,742, Yu Yoshida, filed Oct. 15, 2021.
U.S. Appl. No. 17/502,755, Takayuki Toyoda, filed Oct. 15, 2021.
U.S. Appl. No. 17/502,876, Masashi Kawamura, filed Oct. 15, 2021.
Tadatomi Nishikubo "Addition Reaction of Epoxy Compounds with Esters and Its Application for Polymer Syntheses" Journal of Synthetic Organic Chemistry, Japan, vol. 49, No. 3, p. 218-233, 1991.

*Primary Examiner* — Mark F. Huff
*Assistant Examiner* — Charles Collins Sullivan, IV
(74) *Attorney, Agent, or Firm* — VENABLE LLP

(57) ABSTRACT

A toner comprising a toner particle comprising a binder resin, wherein the toner particle comprises a condensation product of an organosilicon compound, in time-of-flight secondary ion mass spectrometry of the toner particle, a normalized intensity of silicon ions derived from the condensation product of the organosilicon compound is from $7.00\times10^{-4}$ to $3.00\times10^{-2}$, a normalized intensity of silicon ions after sputtering the toner particle under a specific condition is $6.99\times10^{-4}$ or lower, the toner comprises a fine particle on the surface of the toner particle, and the fine particle has at least one selected from the group consisting of a specific fine particle of a polyhydric acid metal salt, a strontium titanate fine particle, a titanium oxide fine particle and an aluminum oxide fine particles.

13 Claims, No Drawings

(56) References Cited

U.S. PATENT DOCUMENTS 8,603,712 B2 12/2013 Aoki et al.
8,609,312 B2 12/2013 Itabashi et al.
8,628,899 B2 1/2014 Kawamura et al.
8,652,725 B2 2/2014 Watanabe et al.
8,697,327 B2 4/2014 Shibata et al.
8,741,519 B2 6/2014 Watanabe et al.
8,785,101 B2 7/2014 Kaya et al.
8,815,484 B2 8/2014 Tanaka et al.
8,828,633 B2 9/2014 Itabashi et al.
8,846,284 B2 9/2014 Kinumatsu et al.
8,916,319 B2 12/2014 Ikeda et al.
8,940,467 B2 1/2015 Hashimoto et al.
8,986,914 B2 3/2015 Fujikawa et al.
9,029,056 B2 5/2015 Kenmoku et al.
9,034,549 B2 5/2015 Shiotari et al.
9,098,002 B2 8/2015 Kenmoku et al.
9,098,003 B2 8/2015 Masumoto et al.
9,146,485 B2 9/2015 Tani et al.
9,158,216 B2 10/2015 Shimano et al.
9,229,345 B2 1/2016 Ikeda et al.
9,256,148 B2 2/2016 Fujikawa et al.
9,261,806 B2 2/2016 Moribe et al.
9,285,697 B2 3/2016 Fukudome et al.
9,309,349 B2 4/2016 Watanabe et al.
9,377,705 B2 6/2016 Shimano et al.
9,383,668 B2 7/2016 Noji et al.
9,423,708 B2 8/2016 Tominaga et al.
9,423,714 B2 8/2016 Kenmoku et al.
9,429,860 B2 8/2016 Kinumatsu et al.
9,556,290 B2 1/2017 Nishiura et al.
9,575,424 B2 2/2017 Nakagawa et al.
9,594,323 B2 3/2017 Fujikawa et al.
9,599,919 B2 3/2017 Isono et al.
9,625,844 B2 4/2017 Kaya et al.
9,658,554 B2 5/2017 Kinumatsu et al.
9,715,187 B2 7/2017 Mukumoto et al.
9,720,340 B2 8/2017 Tominaga et al.
9,733,583 B2 8/2017 Kuroki et al.
9,733,584 B2 8/2017 Masumoto et al.
9,785,068 B2 10/2017 Umeda et al.
9,785,071 B2 10/2017 Shimano et al.
9,785,077 B2 10/2017 Abe et al.
9,798,256 B2 10/2017 Kosaki et al.
9,798,262 B2 10/2017 Toyoizumi et al.
9,811,016 B2 11/2017 Aoki et al.
9,823,595 B2 11/2017 Toyoizumi et al.
9,829,814 B2 11/2017 Yoshida et al.
9,829,816 B2 11/2017 Tanaka et al.
9,829,820 B2 11/2017 Masumoto et al.
9,835,964 B2 12/2017 Yoshida et al.
9,857,711 B2 1/2018 Yoshida et al.
9,857,713 B2 1/2018 Kosaki et al.
9,864,290 B2 1/2018 Yamawaki et al.
9,869,943 B2 1/2018 Aoki et al.
9,880,478 B2 1/2018 Shimano et al.
9,897,932 B2 2/2018 Hotta et al.
9,897,933 B2 2/2018 Yoshida et al.
9,921,501 B2 3/2018 Mochizuki et al.
9,964,879 B2 5/2018 Terui et al.
9,996,018 B2 6/2018 Kubo
10,012,922 B2 7/2018 Yoshida et al.
10,054,866 B2 8/2018 Tanaka et al.
10,078,285 B2 9/2018 Kubo et al.
10,114,303 B2 10/2018 Katsura et al.
10,295,920 B2 5/2019 Nishikawa et al.
10,295,922 B2 5/2019 Terui et al.
10,303,074 B2 5/2019 Yamawaki et al.
10,303,075 B2 5/2019 Tanaka et al.
10,409,180 B2 9/2019 Koji et al.
10,416,582 B2 9/2019 Nakagawa et al.
10,429,757 B2 10/2019 Yoshida et al.
10,437,165 B2 10/2019 Shimano et al.
10,459,360 B2 10/2019 Suzuki et al.
10,503,090 B2 12/2019 Tominaga et al.
10,545,420 B2 1/2020 Kinumatsu et al.
10,545,422 B2 1/2020 Yamawaki et al.
10,551,758 B2 2/2020 Tanaka et al.
10,564,560 B2 2/2020 Onozaki
10,578,990 B2 3/2020 Tsuda et al.
10,635,010 B2 4/2020 Kamikura
10,635,011 B2 4/2020 Umeda et al.
10,678,155 B2 6/2020 Terui et al.
10,732,530 B2 8/2020 Matsui et al.
10,747,133 B2 8/2020 Yagi et al.
10,747,136 B2 8/2020 Kenmoku et al.
10,782,623 B2 9/2020 Yoshiba et al.
10,845,721 B2 11/2020 Tanaka et al.
10,877,388 B2 12/2020 Aoki et al.
10,877,389 B2 12/2020 Kamikura et al.
10,877,390 B2 12/2020 Shimano et al.
10,942,465 B2 3/2021 Kototani et al.
10,942,466 B2 3/2021 Tominaga et al.
10,976,678 B2 4/2021 Yamawaki et al.
10,976,679 B2 4/2021 Tanaka et al.
11,003,104 B2 5/2021 Katsura et al.
11,003,105 B2 5/2021 Sato et al.
11,112,708 B2 9/2021 Uratani et al.
11,169,458 B2 11/2021 Toyoizumi et al.
11,169,460 B2 11/2021 Kototani et al.
11,175,600 B2 11/2021 Uchiyama et al.
11,181,839 B2 11/2021 Yamashita et al.
11,181,840 B2 11/2021 Nagata et al.
11,181,845 B2 11/2021 Shimoda et al.
11,181,846 B2 11/2021 Kinumatsu et al.
2005/0260514 A1 11/2005 Mihara et al.
2006/0194071 A1 8/2006 Yano et al.
2008/0057431 A1 3/2008 Lai
2008/0299482 A1 12/2008 Kato et al.
2009/0233212 A1 9/2009 Fujikawa et al.
2010/0035171 A1 2/2010 Watanabe et al.
2012/0172562 A1 7/2012 Kenmoku et al.
2013/0065174 A1 3/2013 Itabashi et al.
2014/0356779 A1 12/2014 Hasegawa et al.
2014/0377697 A1 12/2014 Nishiura et al.
2015/0004539 A1 1/2015 Watanabe et al.
2015/0378274 A1* 12/2015 Abe .................. G03G 9/09364 430/110.2
2016/0187797 A1 6/2016 Kosaki
2018/0031988 A1 2/2018 Toyoizumi et al.
2019/0235404 A1 8/2019 Kamikura et al.
2020/0341395 A1 10/2020 Ookubo et al.
2020/0341398 A1 10/2020 Kawamura et al.
2020/0356019 A1 11/2020 Matsui et al.
2020/0363742 A1 11/2020 Kyuushima et al.
2020/0409282 A1 12/2020 Unno et al.
2021/0003932 A1 1/2021 Tsuda et al.
2021/0026261 A1 1/2021 Ogaki et al.
2021/0026262 A1 1/2021 Kenmoku et al.
2021/0026264 A1 1/2021 Kamikura et al.
2021/0026265 A1 1/2021 Kamikura et al.
2021/0132519 A1 5/2021 Hashimoto et al.
2021/0181646 A1 6/2021 Matsui et al.
2021/0181648 A1 6/2021 Shimano et al.
2021/0302851 A1 9/2021 Toyoizumi et al.
2021/0311405 A1 10/2021 Shiotari et al.
2021/0405549 A1 12/2021 Ookubo et al.

FOREIGN PATENT DOCUMENTS

DE 102019101831 A 8/2019
EP 3929659 A1 12/2021
GB 1525705 A 9/1978
GB 2136981 A 9/1984
JP 4-229873 A 8/1992
JP 5100476 A 4/1993
JP 6-295096 A 10/1994
JP 7-239573 A 9/1995
JP 10-213924 A 8/1998
JP 11-282194 A 10/1999
JP 2000-122341 A 4/2000
JP 2002-249530 A 9/2002
JP 2005-148409 A 6/2005
JP 2006-259359 A 9/2006
JP 2007-79304 A 3/2007

(56) References Cited

FOREIGN PATENT DOCUMENTS

| | | | |
|---|---|---|---|
| JP | 2007-279712 | A | 10/2007 |
| JP | 2010-181439 | A | 8/2010 |
| JP | 2012-189692 | A | 10/2012 |
| JP | 2013-174745 | A | 9/2013 |
| JP | 2014-130243 | A | 7/2014 |
| JP | 2015-31767 | A | 2/2015 |
| JP | 2015-43049 | A | 3/2015 |
| JP | 2015-75662 | A | 4/2015 |
| JP | 2016-11972 | A | 1/2016 |
| JP | 2016-11973 | A | 1/2016 |
| JP | 2017-49404 | A | 3/2017 |
| JP | 2017-62367 | A | 3/2017 |
| JP | 2017-167446 | A | 9/2017 |
| JP | 2018-151513 | A | 9/2018 |
| JP | 2019-3082 | A | 1/2019 |
| JP | 2019-28475 | A | 2/2019 |
| JP | 2019-133145 | A | 8/2019 |
| JP | 2019-219643 | A | 12/2019 |
| JP | 2019-219647 | A | 12/2019 |
| JP | 2020-63412 | A | 4/2020 |

* cited by examiner

TONER

BACKGROUND OF THE INVENTION

Field of the Invention

The present disclosure relates to a toner used in recording methods that utilize an electrophotographic method, electrostatic recording method, or a toner jet system recording method.

Description of the Related Art

Methods for visualizing image information via an electrostatic latent image, such as an electrophotographic method, have been adopted in copying machines, multifunction apparatus and printers; in recent years, further demands have been placed on such methods in terms of achieving reductions in cost and higher image quality.

Within this context, faithful reproduction of the latent image is required of the toner. Precision control of toner charge is effective for providing faithful reproduction of the latent image. An inadequate control of toner charge results in defects such as, inter alia, fogging, in which low-charge toner is developed into non-image areas, and poor control, in which overcharged toner fuses to the toner carrying member, which are factors that prevent faithful reproduction of the latent image.

Triboelectric charging, in which charge is imparted to toner by rubbing between the toner and a carrier or charging member (collectively referred to in the following as a charging member), has to date been widely investigated as a toner charging process.

However, because rubbing between the charging member and toner may not occur in a uniform manner, triboelectric charging can produce overcharged toner and low-charge toner. This occurs because charging by triboelectric charging is produced only in those regions were the toner and charging member are in contact.

In addition, triboelectric charging is quite susceptible to influence by humidity, and the charge quantity can vary in a low-humidity environment and a high-humidity environment. Moreover, because triboelectric charging is very sensitive to toner flowability, the charge quantity may change when the flowability declines when the toner deteriorates due to, for example, long-term use.

Investigations of the injection charging process have been carried out in order to solve these problems with the triboelectric charging process. The injection charging process is a process in which the toner is charged by the injection of charge due to the potential difference between the toner and the charging member.

In this case, if conduction paths are present in the toner and toner-to-toner, the toner as a whole can be uniformly charged, rather than charging just those regions in contact with a charging member.

Moreover, since, when injection charging is present, the charge quantity can be freely controlled by changing the potential difference, the charge quantity required by a system can then be easily satisfied. Furthermore, since injection charging is resistant to the influence of humidity, environmentally-induced variations in the charge quantity can be suppressed.

However, a problem with the injection charging process is the difficulty in achieving coexistence between charge injection and charge retention. This occurs because the presence of conduction paths in the toner and toner-to-toner facilitates leakage of the injected charge, and as a consequence the charge injection capability and the charge retention capability reside in a trade-off relationship.

Japanese Patent Application Publication No. 2005-148409 discloses a toner for which the volume resistivity is reduced at high voltage, and discloses an injection charging process that uses this toner. A goal for the process described in this patent document is to abolish the trade-off between the charge injection capability and the charge retention capability by carrying out only a charge injection process on the toner at a high voltage where the volume resistivity of the toner is reduced.

From another standpoint, Japanese Patent Application Publication No. 2019-133145 discloses a toner in which the surface of a toner base particle is coated with metal fine particles and an organosilicon compound, with a view to achieving both control of charging characteristics and durability.

SUMMARY OF THE INVENTION

With regard to Japanese Patent Application Publication No. 2005-148409, precise control of the charge quantity has been problematic because discharge is facilitated due to the requirement for high voltage in the charge injection process in order to achieve injection charging by this process. In addition, there is low degree of freedom in designing of the voltage setting of the process because other processes need to be accomplished at lower voltages.

The toner disclosed in Japanese Patent Application Publication No. 2019-133145 exhibits excellent charge rising performance in a conventional triboelectric charging process and at the same time the toner is unlikely to cause member contamination, and boasts superior durability.

On the other hand, there are few means for injecting charge into a toner base particle, and in consequence charge is readily retained on the surface of the toner particle. Therefore, charge leaks readily through the metal fine particles on the toner particle surface, and charge retention capability becomes insufficient; improvements are accordingly required for the purpose of adoption in an injection charging process.

According to the preceding, a toner that achieves a high degree of coexistence in the injection charging process between the charge injection capability and the charge retention capability, has not yet been obtained and further improvements are required.

The present disclosure provides a toner that enables precise charging control and has the ability to achieve a high image quality, by providing coexistence in the injection charging process between the charge injection capability and charge retention capability.

The present disclosure relates to a toner comprising a toner particle comprising a binder resin, wherein the toner particle comprises a condensation product of an organosilicon compound, in time-of-flight secondary ion mass spectrometry TOF-SIMS of the toner particle, a normalized intensity of silicon ions (m/z 28) derived from the condensation product of the organosilicon compound, which is given by Expression (I) below, is from $7.00\times10^{-4}$ to $3.00\times10^{-2}$;

Silicon ion normalized intensity (m/z 28)={ion intensity (m/z 28) of silicon ions}/{total ion intensity of m/z from 0.5 to 1850} (I), a normalized intensity of silicon ions (m/z 28) by time-of-flight secondary ion mass spectrometry after sputtering the toner particle by an Ar gas cluster ion beam Ar-GCIB under condition (A) below is $6.99\times10^{-4}$ or lower;

(A) acceleration voltage: 5 kV, current: 6.5 nA, raster size: 600×600 μm, irradiation time: 5 sec/cycle, sputtering time: 250 sec, the toner comprises a fine particle on the surface of the toner particle, and the fine particle has at least one selected from the group consisting of fine particle of a polyhydric acid metal salt, which is a reaction product of a compound comprising at least one of Ti and Al elements and a polyhydric acid, a strontium titanate fine particle, a titanium oxide fine particle and an aluminum oxide fine particle.

The present disclosure provides a toner that enables precise charging control and has the ability to achieve a high image quality, by providing coexistence in the injection charging process between the charge injection capability and charge retention capability.

Further features of the present invention will become apparent from the following description of exemplary embodiments.

DESCRIPTION OF THE EMBODIMENTS

Unless otherwise specified, descriptions of numerical ranges such as "from XX to YY" or "XX to YY" in the present invention include the numbers at the upper and lower limits of the range.

In a case where numerical value ranges are described in stages, the upper limits and the lower limits of the respective numerical value ranges can be combined arbitrarily.

In order for toner to exhibit a high degree of injection charging suitability it is important that transfer of charge should take place only in the injection charging process, and that transfer of charge should not occur in any other process. The inventors speculated that in order for a toner to exhibit the above characteristics it is necessary that charge can be injected not only in the vicinity of the toner surface but also in the interior of the toner in the injection charging process and that leakage of charge from the vicinity of the toner surface be unlikely to occur in processes other than the injection charging process.

As a result of diligent research, the inventors found that a toner having the following configuration can achieve both injection and retention of charge in the injection charging process.

In other words, the present disclosure relates to a toner comprising a toner particle comprising a binder resin, wherein the toner particle comprises a condensation product of an organosilicon compound, in time-of-flight secondary ion mass spectrometry TOF-SIMS of the toner particle, a normalized intensity of silicon ions (m/z 28) derived from the condensation product of the organosilicon compound, which is given by Expression (I) below, is from $7.00\times10^{-4}$ to $3.00\times10^{-2}$;

Silicon ion normalized intensity (m/z 28)={ion intensity (m/z 28) of silicon ions}/{total ion intensity of m/z from 0.5 to 1850} (I), a normalized intensity of silicon ions (m/z 28) by time-of-flight secondary ion mass spectrometry after sputtering the toner particle by an Ar gas cluster ion beam Ar-GCIB under condition (A) below is $6.99\times10^{-4}$ or lower;

(A) acceleration voltage: 5 kV, current: 6.5 nA, raster size: 600×600 μm, irradiation time: 5 sec/cycle, sputtering time: 250 sec, the toner comprises a fine particle on the surface of the toner particle, and the fine particle has at least one selected from the group consisting of fine particle of a polyhydric acid metal salt, which is a reaction product of a compound comprising at least one of Ti and Al elements and a polyhydric acid, a strontium titanate fine particle, a titanium oxide fine particle and an aluminum oxide fine particle.

The present inventors deem that the underlying mechanism is as follows.

In the above toner configuration, metal-containing fine particles of excellent conductivity present on the toner receive quickly a large amount of charge when charge is injected in the injection charging process, after which charge migrates to a condensation product of an organosilicon compound having a silyl group, which tends to become negatively charged, on the surface of the toner particle.

The metal-containing fine particles become excessively charged at this time in a process of deliberately applying a large amount of charge, as in injection charging. It is considered that, as a result, charge is readily fed also into the condensation product of an organosilicon compound that is in the vicinity of the metal-containing fine particles but not in contact with the metal-containing fine particles, so that a charging effect can be expected to be elicited even with a small amount of the condensation product of an organosilicon compound.

Furthermore, the condensation product of an organosilicon compound interacts with a binder resin, which promotes as a result the transfer of charge into the toner. Through this series of flows, charge can be uniformly and quickly injected from the metal-containing fine particles into the toner, via a small amount of the condensation product of an organosilicon compound present in the vicinity of the toner particle surface, and thus high charge injection capability can be achieved.

Meanwhile, it is deemed that after having undergone the injection charging process, the highly conductive metal-containing fine particles constitute starting points for charge leakage. By limiting herein the condensation product of an organosilicon compound, which easily mediates the transfer of charge, to only a very small amount in the vicinity of the surface of the toner particle, it becomes possible to minimize the transfer of charge from the interior of the toner to the toner surface, and the transfer of charge derived from contact between the condensation product of an organosilicon compound and the metal-containing fine particles.

That is, leakage of charge from the interior of the toner can be suppressed, and high charge retention capability can thus be achieved.

A toner will be explained in the light of the above mechanism.

Examples of the condensation product of an organosilicon compound include a condensation product of an organosilicon compound such as a silane coupling agent; a silane-modified resin resulting from reaction with a silane coupling agent, hydrosilane or the like; a polymer of an organosilane compound, or hybrid resin thereof; as well as condensation products in which the foregoing are used concomitantly. Preferred herein are a condensation product of a silane coupling agent, and a silane-modified resin R having the structure represented by Formula (1) below.

A known organosilicon compound can be used, without particular limitations, as the silane coupling agent. Concrete examples thereof include the following bifunctional silane compounds having two functional groups, and trifunctional silane compounds having three functional groups.

Examples of bifunctional silane compounds include dimethyldimethoxysilane and dimethyldiethoxysilane.

Examples of trifunctional silane compounds include the following.

Trifunctional silane compounds having an alkyl group as a substituent, such as methyltrimethoxysilane, methyltriethoxysilane, methyldiethoxymethoxysilane, methylethoxydimethoxysilane, ethyltrimethoxysilane, ethyltriethoxysilane, propyltrimethoxysilane, propyltriethoxysilane, butyltrimethoxysilane, butyltriethoxysilane, hexyltrimethoxysilane, hexyltriethoxysilane, octyltrimethoxysilane, octyltriethoxysilane, decyltrimethoxysilane and decyltriethoxysilane;

- trifunctional silane compounds having an alkenyl group as a substituent, such as vinyltrimethoxysilane, vinyltriethoxysilane, allyltrimethoxysilane and allyltriethoxysilane;
- trifunctional silane compounds having an aryl group as a substituent, such as phenyltrimethoxysilane and phenyltriethoxysilane;
- trifunctional silane compound having a methacryloxyalkyl group as a substituent, such as γ-methacryloxypropyltrimethoxysilane, γ-methacryloxypropyltriethoxysilane, γ-methacryloxyoctyltrimethoxysilane, γ-methacryloxypropyldiethoxymethoxysilane, γ-methacryloxypropylethoxydimethoxysilane and 3-methacryloxypropyltris(trimethylsiloxy)silane; and
- trifunctional silane compounds having an acryloxyalkyl group as a substituent, such as γ-acryloxypropyltrimethoxysilane, γ-acryloxypropyltriethoxysilane, γ-acryloxyoctyltrimethoxysilane, γ-acryloxypropyldiethoxymethoxysilane and γ-acryloxypropylethoxydimethoxysilane.

The condensation product of an organosilicon compound is more preferably a silane-modified resin R having the structure represented by Formula (1) below. The efficiency of propagation of charge into the toner particle is improved and charge quantity further increased, when the toner particle has the silane-modified resin R as the condensation product of an organosilicon compound.

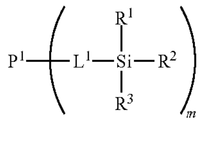

(1)

In Formula (1) above, $P^1$ represents a polymer segment; $L^1$ represents a single bond or a divalent linking group; $R^1$ to $R^3$ each independently represents a hydrogen atom, a halogen atom, an alkyl group having 1 or more carbon atoms, an alkoxy group having 1 or more carbon atoms, an aryl group having 6 or more carbon atoms, or a hydroxy group; m represents a positive integer; in a case where m is equal to or greater than 2, a plurality of $L^1$, a plurality of $R^1$, a plurality of $R^2$ and a plurality of $R^3$ may be respectively identical or different. However, Si is bonded to at least one carbon and at least one of $R^1$ to $R^3$ is condensed with an organosilicon compound.

In a case where at least one of $R^1$ to $R^3$ is condensed with an organosilicon compound, the group condensed with the organosilicon compound has an structure.

Among $R^1$ to $R^3$ in Formula (1) above, preferably at least one represents an alkoxy group having 1 or more carbon atoms, or a hydroxy group. More preferably, groups in $R^1$ to $R^3$ that are not condensed with an organosilicon compound each independently represents an alkoxy group having 1 or more carbon atoms, or a hydroxy group.

Among the above substituents, the number of carbon atoms of the alkyl group is preferably from 1 to 20, more preferably from 1 to 4. The number of carbon atoms of the alkoxy group is preferably from 1 to 20, more preferably from 1 to 4, yet more preferably from 1 to 3, and is particularly preferably 1 or 2. The number of carbon atoms of the aryl group is preferably from 6 to 14, more preferably from 6 to 10.

The content of silicon atoms in the resin R is preferably from 0.02 mass % to 10.00 mass %. The content is more preferably from 0.10 mass % to 5.00 mass %, and yet more preferably from 0.50 mass % to 2.00 mass %.

The content of the resin R relative to 100.0 parts by mass of the binder resin is preferably from 0.10 parts by mass to 10.00 parts by mass, more preferably from 0.20 parts by mass to 5.0 parts by mass, and yet more preferably from 0.50 parts by mass to 2.0 parts by mass.

Herein $P^1$ in Formula (1) is not particularly limited, and examples thereof include polyester resin segments, vinyl resin segments, styrene acrylic resin segments, polyurethane resin segments, polycarbonate resin segments, phenolic resin segments and polyolefin resin segments.

Among the foregoing $P^1$ preferably contains a styrene acrylic resin segment or a polyester resin segment. For instance $P^1$ may be a hybrid resin segment of a polyester resin and a styrene acrylic resin. More preferably, $P^1$ has a polyester resin segment. In a case where $P^1$ is a polyester resin segment, interactions with the binder resin are high, injection charging performance is further improved, and a high charge quantity can be obtained even at a low voltage.

When MwA denotes the weight-average molecular weight of the silane-modified resin R having the structure of Formula (1), MwA is preferably from 8000 to 50000. In a case where MwA is 8000 or higher, the amount of low-molecular weight component is smaller and heat-resistant storability is readily improved. In a case where MwA is 50000 or lower, the molecules exhibit high motility and are readily arranged spatially, after fixing; output paper adhesiveness is readily improved as a result.

More preferably, MwA is from 12000 to 30000. MwA can be controlled through modification of the reaction temperature, reaction time, monomer composition and initiator amount of the resin, or the like.

Any method may be resorted to as the method for forming the silane-modified resin R having the structure of Formula (1); examples thereof include the following methods.

The silane-modified resin R can be formed in accordance with a method that involves reacting a carboxyl group in the resin with an aminosilane coupling agent, a method that involves polymerizing an ethylenically unsaturated binding segment in the resin or a monomer having an ethylenically unsaturated bond and a (meth)acrylic silane coupling agent, a method that involves reacting a hydroxyl group in the resin and an isocyanate-based silane coupling agent, and a method that involves reacting an isocyanate group in the resin with an aminosilane coupling agent.

Examples of aminosilane coupling agents include 3-aminopropyltriethoxysilane, 3-aminopropyltrimethoxysilane, 3-aminopropyldimethoxymethylsilane and 3-aminopropylmethoxydimethylsilane.

Examples of (meth)acrylic silane coupling agents include 3-acryloxypropyltrimethoxysilane, 3-methacryloxypropyltrimethoxysilane, 3-acryloxypropyltriethoxysilane, 3-methacryloxypropyltriethoxysilane, 8-acryloxyoctyltriethoxysilane, 8-methacryloxyoctyltriethoxysilane, 3-[(triethoxysilyl)methyl acrylate, 3-(triethoxysilyl)methyl methacrylate, 3-[dimethoxy(methyl)silyl]propyl acrylate, 3-[dimethoxy(methyl)silyl]propyl methacrylate, [dimethoxy(methyl)silyl]methyl acrylate, [dimethoxy(methyl)silyl]methyl methacrylate and 3-(methacryloyloxy)propyltris(trimethylsilyloxy)silane.

Examples of isocyanate-based coupling agents include isocyanatomethyltrimethoxysilane, isocyanatomethyltriethoxysilane, 3-isocyanatopropyltrimethoxysilane, 3-isocyanatopropyltriethoxysilane and 3-isocyanatopropylmethyldimethoxysilane.

In a case where the $P^1$ structure in the silane-modified resin R having the structure of Formula (1) is a polyester resin segment, examples of the condensation polymerization monomer that can be used for producing the polyester resin segment include polyhydric carboxylic acids and polyhydric alcohols.

Examples of polyhydric carboxylic acids include oxalic acid, glutaric acid, succinic acid, maleic acid, adipic acid, β-methyl adipic acid, azelaic acid, sebacic acid, nonane dicarboxylic acid, decane dicarboxylic acid, undecane dicarboxylic acid, dodecane dicarboxylic acid, fumaric acid, citraconic acid, diglycolic acid, cyclohexane-3,5-diene-1,2-dicarboxylic acid, hexahydroterephthalic acid, malonic acid, pimelliic acid, phthalic acid, isophthalic acid, terephthalic acid, tetrachlorophthalic acid, chlorophthalic acid, nitrophthalic acid, p-carboxyphenyl acetic acid, p-phenylene diacetic acid, m-phenylene diglycolic acid, p-phenylene diglycolic acid, o-phenylene diglycolic acid, diphenyl acetic acid, diphenyl-p,p'-dicarboxylic acid, naphthalene-1,4-dicarboxylic acid, naphthalene-1,5-dicarboxylic acid, naphthalene-2,6-dicarboxylic acid, anthracene dicarboxylic acid and cyclohexanedicarboxylic acid.

Examples of polyhydric carboxylic acids other than dicarboxylic acids include for instance trimellitic acid, pyromellitic acid, naphthalenetricarboxylic acid, naphthalenetetracarboxylic acid, pyrentricarboxylic acid and pyrenetetracarboxylic acid.

Examples of polyhydric alcohols include ethylene glycol, diethylene glycol, triethylene glycol, 1,2-propylene glycol, 1,3-propylene glycol, 1,4-butanediol, neopentylglycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropane triol, 2-methyl-1,2,4-butanetriol, isosorbide, trimethylol ethane, tritrimethylolpropane, 1,3,5-trihydroxymethylbenzene, bisphenol A, bisphenol A ethylene oxide adducts, bisphenol A propylene oxide adducts, hydrogenated bisphenol A, hydrogenated bisphenol A ethylene oxide adducts and hydrogenated bisphenol A propylene oxide adducts.

The polyester resin is not particularly limited, but is preferably a condensate of a dialcohol and a dicarboxylic acid. The polyester resin is preferably for instance a polyester resin having the structure represented by Formula (6) below and at least one of the structures selected from the group consisting of the structures represented by Formulae (7) to (9) below (multiple structures can be selected). Alternatively, the polyester resin may be a polyester resin having a structure represented by Formula (10) below.

(6)

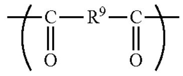

(7)

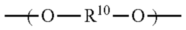

(8)

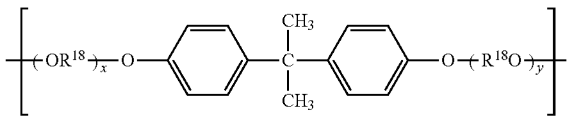

(9)

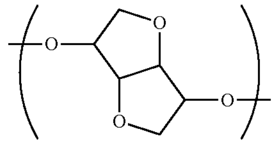

(10)

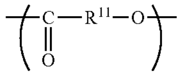

In Formula (6), $R^9$ represents an alkylene group, an alkaneylene group or an arylene group. In Formula (7), $R^{10}$ represents an alkylene group or a phenylene group. In Formula (8), $R^{18}$ represents an ethylene group or a propylene group. Further, x and y are integers equal to or greater than 0 such that the average value of x+y is from 2 to 10. In Formula (10), $R^{11}$ represents an alkylene group or an alkenylene group.

Examples of the alkylene group (preferably having from 1 to 12 carbon atoms) for $R^9$ in the Formula (6) include a methylene group, an ethylene group, a trimethylene group, a propylene group, a tetramethylene group, a hexamethylene group, a neopentylene group, a heptamethylene group, an octamethylene group, a nonamethylene group, a decamethylene group, an undecamethylene group, a dodecamethylene group, and 1,3-cyclopentylene, 1,3-cyclohexylene, and 1,4-cyclohexylene groups.

Examples of the alkenylene group (preferably having from 2 to 4 carbon atoms) for $R^9$ in the Formula (6) include a vinylene group, a propenylene group and a 2-butenylene group.

Examples of the arylene group (preferably having from 6 to 12 carbon atoms) for $R^9$ in the Formula (6) include a 1,4-phenylene group, a 1,3-phenylene group, a 1,2-phenylene group, a 2,6-naphthylene group, a 2,7-naphthylene group and a 4,4'-biphenylene group.

$R^9$ in the Formula (6) may be substituted with a substituent. In this case, examples of the substituent include a methyl group, a halogen atom, a carboxy group, a trifluoromethyl group, and a combination thereof.

Examples of the alkylene group (preferably having from 1 to 12 carbon atoms) for $R^{10}$ in the Formula (7) include a methylene group, an ethylene group, a trimethylene group, a propylene group, a tetramethylene group, a hexamethylene group, a neopentylene group, a heptamethylene group, an octamethylene group, a nonamethylene group, a decamethylene group, an undecamethylene group, a dodecamethylene group, and 1,3-cyclopentylene, 1,3-cyclohexylene, and 1,4-cyclohexylene groups.

Examples of the phenylene group for $R^{10}$ in the Formula (7) include a 1,4-phenylene group, a 1,3-phenylene group, and a 1,2-phenylene group.

$R^{10}$ in the Formula (7) may be substituted with a substituent. In this case, examples of the substituent include a methyl group, an alkoxy group, a hydroxy group, a halogen atom, and a combination thereof.

Examples of the alkylene group (preferably having from 1 to 12 carbon atoms) for $R^{11}$ in the Formula (10) include a methylene group, an ethylene group, a trimethylene group, a propylene group, a tetramethylene group, a hexamethylene group, a neopentylene group, a heptamethylene group, an octamethylene group, a nonamethylene group, a decamethylene group, an undecamethylene group, a dodecamethylene group, and a 1,4-cyclohexylene group.

Examples of the alkenylene group (preferably having from 2 to 40 carbon atoms) for $R^{11}$ in the Formula (10) include a vinylene group, a propenylene group, a butenylene group, a butadienylene group, a pentenylene group, a hexenylene group, a hexadienylene group, a heptenylene group, an octanylene group, a decenylene group, an octadecenylene group, an eicosenylene group, and a triacontenylene group. These alkenylene groups may have any of a linear, branched and cyclic structure. Further, the double bond may be at any position, as long as there is at least one double bond.

$R^{11}$ in the Formula (10) may be substituted with a substituent. In this case, examples of the substituent that may be used for substitution include an alkyl group, an alkoxy group, a hydroxy group, a halogen atom, and a combination thereof.

In a case where the $P^1$ structure is a styrene acrylic resin or a vinyl resin, the monomers thereof are not particularly limited, and known monomers can be used herein. For instance, the following monomers can be used.

Styrene derivatives such as styrene, α-methyl styrene, β-methyl styrene, o-methyl styrene, m-methyl styrene, p-methyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxy styrene and p-phenyl styrene;

acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethylphosphateethyl acrylate, diethylphosphateethyl acrylate, dibutylphosphateethyl acrylate, 2-hydroxyethyl acrylate and 2-benzoyloxyethyl acrylate; and methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, diethylphosphateethyl methacrylate, 2-hydroxyethyl methacrylate and dibutylphosphateethyl methacrylate.

The divalent linking group that can be represented by $L^1$ in Formula (1) is not particularly limited, and examples thereof include the structures represented by Formulae (2) to (5) below. In these cases, injection charging performance can be further improved, and a high charge quantity can be achieved even at low voltage. This can be arguably ascribed to high interaction with the binder resin, with charge being delivered more smoothly to the $P^1$ segment.

The atom of the linking group that is bonded to Si in Formula (1) is preferably a carbon atom.

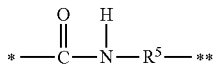
(2)

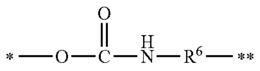
(3)

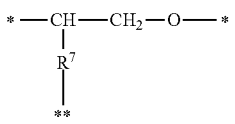
(4)

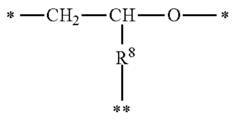
(5)

$R^5$ in the Formula (2) represents a single bond, an alkylene group or an arylene group. (*) represents a binding segment to $P^1$ in the Formula (1), and (**) represents a binding segment to a silicon atom in the Formula (1).

$R^6$ in the Formula (3) represents a single bond, an alkylene group or an arylene group. (*) represents a binding segment to $P^1$ in the Formula (1), and (**) represents a binding segment to a silicon atom in the Formula (1).

$R^7$ and $R^8$ in the Formulae (4) and (5) each independently represent an alkylene group, an arylene group, or an oxyalkylene group. (*) represents a binding segment to $P^1$ in the Formula (1), and (**) represents a binding segment to a silicon atom in the Formula (1).

Among the foregoing, $L^1$ is preferably a divalent linking group containing an amide bond represented by Formula (2) above.

The structure represented by Formula (2) is a divalent linking group containing an amide bond.

The linking group can be formed, for example, by reacting a carboxy group in the resin with an aminosilane.

The aminosilane is not particularly limited, and examples thereof include γ-aminopropyltriethoxysilane, γ-aminopropyltrimethoxysilane, N-β-(aminoethyl) γ-aminopropyltrimethoxysilane, N-β-(aminoethyl) γ-aminopropylmethyldimethoxysilane, N-phenyl γ-aminopropyltriethoxysilane, N-phenyl γ-aminopropyltrimethoxysilane, N-β-(aminoethyl) γ-aminopropyltriethoxysilane, N-6-(aminohexyl) 3-aminopropyltrimethoxysilane, 3-aminopropyltrimethylsilane, 3-aminopropylsilicon and the like.

The alkylene group (preferably having from 1 to 12 carbon atoms, more preferably having from 2 to 4 carbon atoms) in $R^5$ is not particularly limited, and may be, for example, an alkylene group including an —NH— group.

The arylene group (preferably having from 6 to 12 carbon atoms, more preferably having from 6 to 10 carbon atoms) in $R^5$ is not particularly limited, and may be, for example, an arylene group including a hetero atom.

The structure represented by the Formula (3) is a divalent linking group including a urethane bond.

The linking group can be formed, for example, by reacting a hydroxy group in the resin with an isocyanate silane.

The isocyanate silane is not particularly limited, and examples thereof include 3-isocyanatopropyltrimethoxysilane, 3-isocyanatopropylmethyldimethoxysilane, 3-isocyanatopropyldimethylmethoxysilane, 3-isocyanatopropyltriethoxysilane, 3-isocyanatopropylmethyldiethoxysilane, 3-isocyanatopropyldimethylethoxysilane and the like.

The alkylene group (preferably having from 1 to 12 carbon atoms, more preferably having from 2 to 4 carbon atoms) in $R^6$ is not particularly limited, and may be, for example, an alkylene group including an —NH— group.

The arylene group (preferably having from 6 to 12 carbon atoms, more preferably having from 6 to 10 carbon atoms) in $R^6$ is not particularly limited, and may be, for example, an arylene group including a hetero atom.

The structure represented by the Formula (4) or (5) is a divalent linking group including a bond grafted to an ester bond in the resin.

The linking group is formed by, for example, an epoxysilane insertion reaction.

The term "epoxysilane insertion reaction" refers to a reaction including a step of causing an insertion reaction of an epoxy group of epoxysilane into an ester bond contained in a main chain in a resin. Further, the term "insertion reaction" as used herein is described in "Journal of Synthetic Organic Chemistry, Japan", Vol. 49, No. 3, p. 218, 1991, as "an insertion reaction of an epoxy compound into an ester bond in a polymer chain".

The reaction mechanism of the epoxysilane insertion reaction can be represented by the following model diagram.

(A)

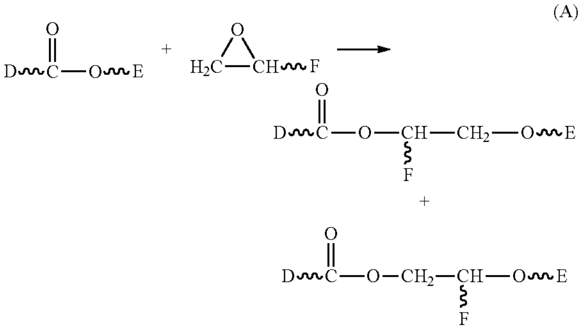

In the above diagram, D and E indicate the constituent parts of the resin, and F indicates the constituent part of the epoxy compound.

Two kinds of compounds are formed due to α-cleavage and β-cleavage in the ring opening of the epoxy group in the diagram. In both cases, a compound is obtained in which an epoxy group is inserted into an ester bond in a resin, in other words, a compound in which a constituent part of the epoxy compound other than the epoxy segment is grafted to the resin.

The epoxysilane is not particularly limited, and may be, for example, β-(3,4-epoxycyclohexyl)ethyltrimethoxysilane, γ-glycidoxypropyltrimethoxysilane, γ-glycidoxypropylmethyldiiethoxysilane and the like.

The alkylene group (preferably having from 1 to 12 carbon atoms, more preferably having from 2 to 4 carbon atoms) in $R^7$ and $R^8$ is not particularly limited, and may be, for example, an alkylene group including an —NH— group.

The arylene group (preferably having from 6 to 12 carbon atoms, more preferably having from 6 to 10 carbon atoms) in $R^7$ and $R^8$ is not particularly limited, and may be, for example, an arylene group including a hetero atom.

The oxyalkylene group (preferably having from 1 to 12 carbon atoms, more preferably having from 2 to 4 carbon atoms) in $R^7$ and $R^8$ is not particularly limited, and may be, for example, an oxyalkylene group including an —NH— group.

A normalized intensity of silicon ions (m/z 28) given by Expression (I) and derived from a condensation product of an organosilicon compound, in time-of-flight secondary ion mass spectrometry TOF-SIMS of the toner particle, needs to lie in the range from $7.00\times10^{-4}$ to $3.00\times10^{-2}$.

Silicon ion normalized intensity (m/z 28)={ion intensity (m/z 28) of silicon ions}/{total ion intensity of m/z from 0.5 to 1850} (I)

When the normalized intensity of silicon ions (m/z 28) is lower than $7.00\times10^{-4}$, charge injection capability is not brought out and also uniform charging performance fails to be obtained. When the normalized intensity of silicon ions (m/z 28) is higher than $3.00\times10^{-2}$, charge retention capability cannot be brought out, and as a result it is difficult to achieve both charge injection capability and charge retention capability.

For the purpose of achieving higher charge retention capability, the normalized intensity of silicon ions (m/z 28) is more preferably from $7.00\times10^{-4}$ to $8.00\times10^{-3}$, and yet more preferably from $8.00\times10^{-4}$ to $8.00\times10^{-3}$.

A normalized intensity lying within such ranges indicates that amount of silicon ions on the surface of the toner particle is much smaller than that in conventional art. It is deemed that a normalized intensity within the above ranges is obtained and as a result, both charge injection capability and charge retention capability can be obtained, by resorting to measures such as using an organosilicon compound in a very small amount as compared with conventional instances, controlling the hydrolysis of the organosilicon compound, by shortening the condensation time, and the like.

Further, the normalized intensity of silicon ions (m/z 28) by time-of-flight secondary ion mass spectrometry after sputtering the toner particle by an Ar gas cluster ion beam Ar-GCIB under condition (A) below needs to be $6.99\times10^{-4}$ or lower.

(A) acceleration voltage: 5 kV, current: 6.5 nA, raster size: 600×600 μm, irradiation time: 5 sec/cycle, sputtering time: 250 sec Silicon ions derived from a condensation product of an organosilicon compound present inside the toner particle can be evaluated by performing sputtering under condition (A); herein, the less condensation product of an organosilicon compound inside the toner particle, the more charge retention capability is improved. Preferably, the normalized intensity is $6.00\times10^{-4}$ or lower. The lower limit of the normalized intensity is not particularly restricted, but is preferably $1.00\times10^{-4}$ or higher, and more preferably $2.00\times10^{-4}$ or higher.

Any method may be resorted to as the method for obtaining a toner particle having a desired silicon ion (m/z 28) normalized intensity. In a case, for instance, where a silane-modified resin R is used as the condensation product of an organosilicon compound, examples of such a method include a method for adding the resin R in a step of dissolving or dispersing a polymerizable monomer that is capable of generating a binder resin.

In a case where a condensation product of a silane coupling agent is used as the condensation product of an organosilicon compound, examples include a method in which condensation polymerization is carried out after the addition of a silane coupling agent as appropriate, in a step of dissolving or dispersing a polymerizable monomer, or in a step of obtaining a toner particle through polymerization of a polymerizable monomer. Other methods include a method that involves adding a silane coupling agent to a toner particle dispersion, with condensation polymerization.

An optimal pH may exist for the condensation polymerization reaction of the organosilicon compound, and accordingly the reaction can be caused to proceed effectively by conducting the condensation polymerization of the organosilicon compound at an optimal pH for the condensation polymerization reaction.

The method for adding the organosilicon compound such as a silane coupling agent may involve adding the organosilicon compound as-is, or mixing beforehand the organosilicon compound with an aqueous medium and adding thereafter the resulting hydrolyzed product.

The method for controlling the normalized intensity of silicon ions (m/z 28) in the vicinity of the surface of the toner particle or inside the toner particle may involve controlling, for instance, the addition amount of organosilicon compound, the polymerization conversion ratio of the polymerizable monomer, the hydrolysis time or condensation polymerization time after addition of the organosilicon compound, for forming the condensation product of an organosilicon compound.

Furthermore, the toner has fine particles on the surface of the toner particle. The fine particles have at least one selected from the group consisting of fine particles of a polyhydric acid metal salt, which are a reaction product of a compound comprising at least one of Ti and Al elements and a polyhydric acid, strontium titanate fine particles, titanium oxide fine particles and aluminum oxide fine particles.

Preferred among the foregoing are fine particles of a polyhydric acid metal salt, which are a reaction product of a polyhydric acid and a compound containing Ti and/or Al, and more preferably with Ti as the metal element, with a view to achieving higher injection charging performance in the toner as a whole and achieving yet more uniform charging performance. Yet more preferably, the polyhydric acid in the above fine particles of a polyhydric acid metal salt is phosphoric acid, since in that case a charge quantity distribution is rendered yet more uniform.

The content of the fine particles is preferably from 0.01 parts by mass to 5.00 parts by mass, more preferably from 0.02 parts by mass to 3.00 parts by mass, and yet more preferably from 0.10 parts by mass to 0.30 parts by mass, relative to 100 parts by mass of the toner particle.

Heretofore known polyhydric acids can be used without particular limitation as the polyhydric acid.

The polyhydric acid preferably contains an inorganic acid. Inorganic acids have a more rigid molecular skeleton than organic acids and as a consequence they undergo little change in properties during long-term storage. An injection charging capability can thus be obtained in a stable manner even after long-term storage.

The polyhydric acid can be specifically exemplified by inorganic acids, e.g., phosphoric acid (tribasic), carbonic acid (dibasic), and sulfuric acid (dibasic), and by organic acids such as dicarboxylic acids (dibasic) and tricarboxylic acids (tribasic).

The organic acids can be specifically exemplified by dicarboxylic acids such as oxalic acid, malonic acid, succinic acid, glutaric acid, adipic acid, fumaric acid, maleic acid, pimelic acid, suberic acid, azelaic acid, sebacic acid, phthalic acid, isophthalic acid, and terephthalic acid, and by tricarboxylic acids such as citric acid, aconitic acid, and trimellitic anhydride.

Among the preceding, at least one selection from the group consisting of phosphoric acid, carbonic acid, and sulfuric acid, which are inorganic acids, is preferred with phosphoric acid being particularly preferred.

Concrete examples of the polyhydric acid metal salt include metal phosphate salts such as titanium phosphate compounds and aluminum phosphate compounds; metal sulfate salts such as titanium sulfate compounds and aluminum sulfate compounds; metal carbonate salts such as titanium carbonate compounds and aluminum carbonate compounds; and oxalate metal salts such as titanium oxalate compounds. Preferred among the foregoing are titanium phosphate compounds.

The method for obtaining the fine particles of a polyhydric acid metal salt is not particularly limited, and a known method can be resorted to. Preferred among the foregoing is a method that involves reacting polyhydric acid ions and a metal compound that constitutes a metal source in an aqueous medium, to thereby obtain fine particles of a polyhydric acid metal salt.

In a case where the fine particles of a polyhydric acid metal salt are obtained in accordance with the above method, a conventionally known metal compound can be used without particular limitations as the metal source, so long as the metal compound can yield a polyhydric acid metal salt through reaction with polyhydric acid ions.

Specific examples are metal chelates such as titanium lactate, titanium tetraacetylacetonate, ammonium titanium lactate, titanium triethanolaminate, zirconium lactate, ammonium zirconium lactate, aluminum lactate, aluminum trisacetylacetonate, and copper lactate, and metal alkoxides such as titanium tetraisopropoxide, titanium ethoxide, zirconium tetraisopropoxide, and aluminum trisisopropoxide.

Metal chelates are preferred among the preceding because their reaction is easily controlled and they react quantitatively with the polyhydric acid ion. Lactic acid chelates, e.g., titanium lactate, zirconium lactate, and so forth, are more preferred from the standpoint of solubility in aqueous media.

An ion of the aforementioned polyhydric acids can be used as the polyhydric acid ion. With regard to the form in the case of addition to an aqueous medium, the polyhydric acid may be added as such or a water-soluble polyhydric acid metal salt may be added to the aqueous medium and may dissociate in the aqueous medium.

When the polyhydric acid metal salt fine particle is obtained by the aforementioned method, the number-average particle diameter DA of the fine particles of a polyhydric acid metal salt can be controlled through, for example, the reaction temperature and starting material concentration during the synthesis of the fine particles of a polyhydric acid metal salt.

The number-average particle diameter DA of the fine particles of a polyhydric acid metal salt is preferably from 3 nm to 100 nm, more preferably from 5 nm to 30 nm and yet more preferably from 8 nm to 20 nm.

The total content of Ca and Mg elements in the toner particle as measured by an inductively coupled plasma atomic emission spectrometer, is preferably 23 μmol/g or less, and more preferably 20 μmol/g or less. The lower limit is not particularly restricted, but is preferably 0 μmol/g or higher, more preferably 2 μmol/g or higher.

The total content within the above ranges indicates that the amount of metal elements that constitute charge leak sources is small in the vicinity of the toner particle surface, so that charge retention capability is improved and both charge retention capability and injection charging performance can be achieved yet more readily.

A calcium compound and/or magnesium compound may be used as a dispersing agent in a case where the toner particle is produced in an aqueous medium. The above content can be controlled, for instance, on the basis of the use amount of these dispersing agents, and by the removal of the dispersing agent by washing of the toner particle, and the like.

Method for Producing a Toner Particle

A method for producing a toner particle will be explained. A known means, for instance, a kneading pulverization method or wet production method can be resorted to as the method for producing the toner particle. A wet production method can be preferably used from the viewpoint of making particle diameter uniform and in terms of shape controllability. Examples of wet production methods include a suspension polymerization method, a dissolution suspension method, an emulsion polymerization aggregation method, an emulsion aggregation method and the like; preferably, a suspension polymerization method can be resorted to among the foregoing.

A method for producing a toner particle in accordance with a suspension polymerization method will be explained next.

Firstly, a polymerizable monomer capable of yielding a binder resin, and various materials as needed, are mixed and a disperser is used to prepare a polymerizable monomer composition in which the above materials are dissolved or dispersed.

Examples of the above various materials include a colorant, a wax release agent, a charge control agent, a polymerization initiator, a chain transfer agent and the like.

Examples of the disperser include a homogenizer, a ball mill, a colloid mill and an ultrasonic disperser.

Next, the polymerizable monomer composition is added to an aqueous medium that contains poorly water-soluble inorganic fine particles to prepare droplets of the polymerizable monomer composition using a high-speed disperser such as a high-speed stirrer or ultrasonic disperser (granulating step).

Thereafter the polymerizable monomer in the droplet of the polymerizable monomer composition is polymerized to yield a toner particle (polymerization state).

The polymerization initiator may be admixed during the preparation of the polymerizable monomer composition or may be admixed into the polymerizable monomer composition immediately prior to droplet formation in the aqueous medium.

In addition, it may also be added, optionally dissolved in the polymerizable monomer or another solvent, during granulation into droplets or after the completion of granulation, i.e., immediately before the initiation of the polymerization reaction.

Once resin particles are obtained through polymerization of the polymerizable monomer, a solvent removal process may be carried out as needed to obtain a dispersion of the toner particle.

The weight-average particle diameter (D4) of the toner particle is preferably from 4.0 μm to 12.0 μm, more preferably from 5.0 μm to 8.0 μm.

The average circularity of the toner particle is preferably from 0.940 to 0.995, more preferably from 0.950 to 0.990, and yet more preferably from 0.970 to 0.990.

The glass transition temperature Tg of the toner particle is preferably from 40° C. to 70° C., more preferably from 50° C. to 60° C.

Constituent materials of the toner particle will be explained below.

Binder Resin

Preferred examples of the binder resin include vinyl resins and polyester resins. Examples of vinyl resins, polyester resins and other binder resins include the resins and polymers below.

Monopolymers of styrene and substituents thereof such as polystyrene and polyvinyltoluene; styrenic copolymers such as styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-dimethylaminoethyl acrylate copolymers, styrene-methyl methacrylate copolymers, styrene-ethyl methacrylate copolymers, styrene-butyl methacrylate copolymers, styrene-dimethylaminoethyl methacrylate copolymers, styrene-vinyl methyl ether copolymers, styrene-vinyl ethyl ether copolymers, styrene-vinyl methyl ketone copolymers, styrene-butadiene copolymers, styrene-isoprene copolymers, styrene-maleic acid copolymers and styrene-maleic acid ester copolymers; as well as polymethyl methacrylate, polybutyl methacrylate, polyvinyl acetate, polyethylene, polypropylene, polyvinyl butyral, silicone resins, polyamide resins, epoxy resins, polyacrylic resins, rosin, modified rosin, terpene resins, phenolic resins, aliphatic or alicyclic hydrocarbon resins, and aromatic petroleum resins. These binder resins can be used singly or in combination.

Examples of polymerizable monomers that can be used for producing a vinyl resin include styrenic monomers such as styrene and α-methyl styrene; acrylate esters such as methyl acrylate and butyl acrylate; methacrylate esters such as methyl methacrylate, 2-hydroxyethyl methacrylate, t-butyl methacrylate and 2-ethylhexyl methacrylate; unsaturated carboxylic acids such as acrylic acid and methacrylic acid; unsaturated dicarboxylic acids such as maleic acid; unsaturated dicarboxylic acid anhydrides such as maleic anhydride; nitrile-based vinyl monomers such as acrylonitrile; halogen-containing vinyl monomers such as vinyl chloride; and nitro-based vinyl monomers such as nitrostyrene.

Besides these monomers, also the monomers described above concerning P' can be used herein.

The binder resin preferably contains a carboxy group, and is preferably a resin produced using a polymerizable monomer that contains a carboxy group.

Examples of polymerizable monomers containing a carboxy group include, for instance, vinylic carboxylic acids such acrylic acid, methacrylic acid, α-ethylacrylic acid and crotonic acid; unsaturated dicarboxylic acids such as fumaric acid, maleic acid, citraconic acid and itaconic acid; and unsaturated dicarboxylic acid monoester derivatives such as monoacryloyloxyethyl succinate, monomethacryloyloxyethyl succinate, monoacryloyloxyethyl phthalate and monomethacryloyloxyethyl phthalate.

A polyester resin resulting from condensation polymerization of a carboxylic acid component and an alcohol component enumerated below can be used as the polyester resin. Examples of the carboxylic acid component include terephthalic acid, isophthalic acid, phthalic acid, fumaric acid, maleic acid, cyclohexanedicarboxylic acid and trimellitic acid. Examples of the alcohol component include bisphenol A, hydrogenated bisphenol, ethylene oxide adducts of bisphenol A, propylene oxide adducts of bisphenol A, glycerin, trimethylolpropane and pentaerythritol.

The polyester resin may be a polyester resin containing a urea group. Preferably, the polyester resin has an uncapped carboxy group, for instance, at a terminus.

Besides these monomers, also the monomers described above concerning P' can be used herein.

In order to control the molecular weight of the binder resin, a crosslinking agent may be added during the polymerization of the polymerizable monomer.

For example, ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, polyethylene glycol #200, #400, #600 diacrylate, dipropylene glycol diacrylate, polypropylene glycol diacrylate, polyester type diacrylate (MANDA, manufactured by Nippon Kayaku Co., Ltd.), and the above acrylates converted to methacrylates.

Preferably, the addition amount of the crosslinking agent is from 0.001 parts by mass to 15.000 parts by mass relative to 100 parts by mass of the polymerizable monomer.

Release Agent

The toner particle preferably contains a release agent. The toner particle preferably contains an ester wax having a melting point from 60° C. to 90° C. Such a wax exhibits excellent compatibility with the binder resin, and hence readily affords a plasticizing effect.

Examples of ester waxes include waxes having a fatty acid ester as a main component, such as carnauba wax and montanate ester wax; wholly or partially deacidified products of the acid component of fatty acid esters, such as deacidified carnauba wax; methyl ester compounds having a hydroxyl group and obtained through hydrogenation of a vegetable oil and the like; saturated fatty acid monoesters such as stearyl stearate and behenyl behenate; diesterification products of saturated aliphatic dicarboxylic acids and saturated aliphatic alcohols, such as dibehenyl sebacate, distearyl dodecanedioate and distearyl octadecanedioate; as well as diesterification products of saturated aliphatic diols and saturated aliphatic monocarboxylic acids, such as nonanediol dibehenate and dodecanediol distearate.

Preferably among the foregoing, the wax includes a bifunctional ester wax (diester) having two ester bonds in the molecular structure.

The bifunctional ester wax is an ester compound of a dihydric alcohol and an aliphatic monocarboxylic acid, or an ester compound of a dihydric carboxylic acid and an aliphatic monoalcohol.

Concrete examples of aliphatic monocarboxylic acids include myristic acid, palmitic acid, stearic acid, arachidic acid, behenic acid, lignoceric acid, cerotic acid, montanic acid, melissic acid, oleic acid, vaccenic acid, linoleic acid and linolenic acid.

Concrete examples of aliphatic monoalcohols include myristyl alcohol, cetanol, stearyl alcohol, arachidyl alcohol, behenyl alcohol, tetracosanol, hexacosanol, octacosanol and triacontanol.

Concrete examples of dihydric carboxylic acids include butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), dodecanedioic acid, tridecanedioic acid, tetradecanedioic acid, hexadecanedioic acid, octadecanedioic acid, eicosanedioic acid, phthalic acid, isophthalic acid and terephthalic acid.

Concrete examples of dihydric alcohols include ethylene glycol, propylene glycol, 1,3-propanediol, 1,4-butanediol, 1,5-pentanediol, 1,6-hexanediol, 1,10-decanediol, 1,12-dodecanediol, 1,14-tetradecanediol, 1,16-hexadecanediol, 1,18-octadecanediol, 1,20-eicosanediol, 1,30-triacontanediol, diethylene glycol, dipropylene glycol, 2,2,4-trimethyl-1,3-pentanediol, neopentylglycol, 1,4-cyclohexanedimethanol, spiroglycol, 1,4-phenylene glycol, bisphenol A and hydrogenated bisphenol A.

Other examples of release agents that can be used include petroleum waxes and derivatives thereof, such as paraffin wax, microcrystalline wax and petrolatum; montan wax and derivatives thereof; hydrocarbon waxes and derivatives thereof obtained by the Fischer-Tropsch method; polyolefin waxes and derivatives thereof such as polyethylene and polypropylene; natural waxes and derivatives thereof such as carnauba wax and candelilla wax; as well as fatty acids such as higher aliphatic alcohols, stearic acid and palmitic acid.

The content of the release agent is preferably from 5.0 parts by mass to 20.0 parts by mass relative to 100.0 parts by mass of the binder resin.

Colorant

The toner particle may contain a colorant. The colorant is not particularly limited, and known colorants such as those below can be used herein.

Examples of yellow pigment include yellow iron oxide, and condensed azo compounds such as Navels Yellow, Naphthol Yellow S, Hanza Yellow G, Hanza Yellow 10G, Benzidine Yellow G, Benzidine Yellow GR, Quinoline Yellow Lake, Permanent Yellow NCG, and Tartrazine Lake, isoindolinone compounds, anthraquinone compounds, azo metal complexes, methine compounds, and allylamide compounds. Specifically, the following are listed.

C. I. Pigment Yellow 12, 13, 14, 15, 17, 62, 74, 83, 93, 94, 95, 109, 110, 111, 128, 129, 147, 155, 168, and 180.

Examples of red pigments include Indian Red, condensation azo compounds such as Permanent Red 4R, Lithol Red, Pyrazolone Red, Watching Red calcium salt, Lake Red C, Lake Red D, Brilliant Carmine 6B, Brilliant Carmine 3B, Eosin Lake, Rhodamine Lake B, Alizarin Lake and the like, diketopyrrolopyrrole compounds, anthraquinone compounds, quinacridone compounds, basic dye lake compounds, naphthol compounds, benzimidazolone compounds, thioindigo compounds, and perylene compounds. Specifically, the following are listed.

C. I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254.

Examples of blue pigments include copper phthalocyanine compounds and derivatives thereof such as Alkali Blue Lake, Victoria Blue Lake, Phthalocyanine Blue, metal-free Phthalocyanine Blue, partial Phthalocyanine Blue chloride, Fast Sky Blue, Indathrene Blue BG and the like, anthraquinone compounds, basic dye lake compound and the like. Specifically, the following are listed.

C. I. Pigment Blue 1, 7, 15, 15:1, 15:2, 15:3, 15:4, 60, 62, and 66.

Examples of black pigments include carbon black and aniline black. These colorants can be used singly or in mixtures thereof, and also in a solid solution state.

The content of the colorant is preferably from 3.0 parts by mass to 15.0 parts by mass relative to 100.0 parts by mass of the binder resin.

External Additive

For the toner, various organic or inorganic fine powders may be used concomitantly as external additive in the toner particle, so long as the above characteristics or the above effects are not impaired thereby.

Methods for measuring various physical properties are described below.

Method for Measuring the Weight-Average Particle Diameter (D4) and Number-Average Particle Diameter (D1) of a Toner Particle The weight-average particle diameter (D4) and number-average particle diameter (D1) of the toner particle is determined proceeding as follows.

The measurement instrument used is a "Coulter Counter Multisizer 3" (registered trademark, Beckman Coulter, Inc.), a precision particle size distribution measurement instrument operating on the pore electrical resistance method and equipped with a 100-μm aperture tube.

The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels.

The aqueous electrolyte solution used for the measurements is prepared by dissolving special-grade sodium chloride in deionized water to provide a concentration of 1.0%, for example, "ISOTON II" (Beckman Coulter, Inc.) can be used.

The dedicated software is configured as follows prior to measurement and analysis.

In the "modify the standard operating method (SOMME)" screen in the dedicated software, the total count number in the control mode is set to 50,000 particles; the number of measurements is set to 1 time; and the Kd value is set to the value obtained using "standard particle 10.0 μm" (Beckman Coulter, Inc.).

The threshold value and noise level are automatically set by pressing the "threshold value/noise level measurement button". In addition, the current is set to 1,600 μA; the gain is set to 2; the electrolyte solution is set to ISOTON II; and a check is entered for the "post-measurement aperture tube flush".

In the "setting conversion from pulses to particle diameter" screen of the dedicated software, the bin interval is set to logarithmic particle diameter; the particle diameter bin is set to 256 particle diameter bins; and the particle diameter range is set to 2 μm to 60 μm.

The specific measurement procedure is as follows.

(1) 200.0 mL of the aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) 30.0 mL of the aqueous electrolyte solution is introduced into a 100-mL flatbottom glass beaker. To this is added as dispersing agent 0.3 mL of a dilution prepared by the three-fold (mass) dilution with deionized water of "Contaminon N" (a 10% aqueous solution of a neutral pH 7 detergent for cleaning precision measurement instrumentation, comprising a nonionic surfactant, anionic surfactant, and organic builder, from Wako Pure Chemical Industries, Ltd.).

(3) An "Ultrasonic Dispersion System Tetra 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180°. 3.3 L of deionized water is introduced into the water tank of the ultrasound disperser and 2.0 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, 10 mg of the toner particle, is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the aqueous electrolyte solution prepared in (5) and containing the dispersed toner particle is dripped into the roundbottom beaker set in the sample stand as described in (1) with adjustment to provide a measurement concentration of 5%. Measurement is then performed until the number of measured particles reaches 50,000.

(7) The measurement data is analyzed by the dedicated software provided with the instrument and the weight-average particle diameter (D4) and the number-average particle diameter (D1) are calculated. When set to graph/volume % with the dedicated software, the "average diameter" on the "analysis/volumetric statistical value (arithmetic average)" screen is the weight-average particle diameter (D4). When set to graph/number % with the dedicated software, the "average diameter" on the "analysis/numerical statistical value (arithmetic average)" screen is the number-average particle diameter (D1).

Method for Measuring Glass Transition Temperature (Tg)

The glass transition temperature (Tg) of, e.g., the binder resin and toner, is measured using a differential scanning calorimeter (also referred to below as "DSC").

Measurement of the glass transition temperature is performed by DSC in accordance with JIS K 7121 (international standard: ASTM D 3418-82).

A "Q1000" (TA Instruments) is used in this measurement, using the melting points of indium and zinc for temperature correction of the instrument detection section and using the heat of fusion of indium for correction of the amount of heat.

For the measurement, a 10 mg measurement sample is exactly weighed out and this is introduced into an aluminum pan; an empty aluminum pan is used for reference.

In a first ramp-up process, the measurement is run while heating the measurement sample from 20° C. to 200° C. at 10° C./min. This is followed by holding for 10 minutes at 200° C. and then the execution of a cooling process of cooling from 200° C. to 20° C. at 10° C./min.

After then holding for 10 minutes at 20° C., reheating from 20° C. to 200° C. at 10° C./min is carried out in a second ramp up process.

The glass transition temperature here is the midpoint glass transition temperature. Using the DSC curve from the second ramp-up process as obtained under the measurement conditions described above, the glass transition temperature (Tg) is taken to be the temperature at the point where the curve segment for the stepwise change at the glass transition temperature intersects with the straight line that is equidistant, in the direction of the vertical axis, from the straight lines that extend the base lines on the low temperature side and high temperature side of the stepwise change.

When the toner particle has been produced, for example, in an aqueous medium, a portion is taken as a sample and the DSC measurement is run thereon after washing out other than the toner particle and drying.

Method for Measuring Average Circularity

The average circularity of the toner and toner particle is measured using an "FPIA-3000" (Sysmex Corporation), a flow particle image analyzer, under the measurement and analysis conditions during the calibration work.

The specific measurement procedure is as follows.

First, 20 mL of deionized water—from which, e.g., solid impurities, have been removed in advance—is introduced into a glass vessel. To this is added as dispersing agent about 0.2 mL of a dilution prepared by the about three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.).

0.02 g of the measurement sample is added and a dispersion treatment is carried out for 2 minutes using an ultrasound disperser to provide a dispersion to be used for the measurement. Cooling is carried out as appropriate during this process in order to have the temperature of the dispersion be from 10° C. to 40° C.

Using a benchtop ultrasound cleaner/disperser that has an oscillation frequency of 50 kHz and an electrical output of 150 W (for example, the "VS-150" (Velvo-Clear Co., Ltd.)) as the ultrasound disperser, a predetermined amount of deionized water is introduced into the water tank and approximately 2 mL of Contaminon N is added to the water tank.

The flow particle image analyzer fitted with a "UPlanApro" objective lens (10×, numerical aperture: 0.40) is used for the measurement, and "PSE-900A" (Sysmex Corporation) particle sheath is used for the sheath solution.

The dispersion prepared according to the procedure described above is introduced into the flow particle image analyzer and 3,000 of the toner particles are measured according to total count mode in HPF measurement mode.

The average circularity of the toner or toner particle is determined with the binarization threshold value during particle analysis set at 85% and with the analyzed particle diameter limited to a circle-equivalent diameter from 1.985 μm to less than 39.69 μm.

For this measurement, automatic focal point adjustment is performed prior to the start of the measurement using reference latex particles (for example, a dilution with deionized water of "RESEARCH AND TEST PARTICLES Latex Microsphere Suspensions 5200A", Duke Scientific Corporation). After that, focus point adjustment is performed every two hours from the start of measurement.

Method for Measuring the Number-Average Particle Diameter of Primary Particles of Fine Particles of a Polyhydric Acid Metal Salt The number-average particle diameter of the primary particles of the fine particles of a polyhydric acid metal salt is measured using a scanning electron microscope "S-4800" (product name, by Hitachi, Ltd.). Toner having had fine particles of a polyhydric acid metal salt added thereto is observed, and the major axis of 100 random primary particles of the external additive is measured, in a field maximally magnified to 50,000 magnifications. The observation magnification is adjusted as appropriate according to the size of the fine particles of a polyhydric acid metal salt.

Method for Measuring the Normalized Intensity of Silicon Ions Present on the Toner Particle Surface The normalized intensity of silicon ions at the toner particle surface is ascertained using a time-of-flight secondary ion mass spectrometer (TOF-SIMS). The apparatus used and the measurement conditions are as follows.

The measurement is carried out in toner from which an external additive such as the fine particles of a polyhydric acid metal salt has been removed in accordance with the below-described method.

Measuring device: nanoTOF II (product name, by Ulvac-Phi, Inc.)
Primary ion species: $Bi^{3++}$
Acceleration voltage: 30 kV
Primary ion current: 0.05 pA
Repeat frequency: 8.2 kHz
Raster mode: unbunch
Raster size: 100 μm×100 μm
Measurement mode: positive
Neutralizing electron gun: used
Measurement time: 600 seconds
Sample preparation: toner particle fixed to an indium sheet
Sample pretreatment: none Evaluation is carried out on the basis of the mass numbers of Si ions and fragment ions derived from the resin or silane compound, using ULVAC-PHI standard software (TOF-DR).

The silicon ion normalized intensity (m/z 28) can be derived by dividing the ion intensity derived from silicon (m/z 28) having a mass number of 28 by the total ion intensity of mass numbers from 1 to 1850.

The fact that the silicon ion normalized intensity (m/z 28) derives from a condensation product of an organosilicon compound is confirmed herein by a $^{29}$Si-NMR (solid) measurement described below. In a case where the toner particle contains a silicon compound other than a condensation product of an organosilicon compound, the content ratio of the condensation product of an organosilicon compound relative to the silicon compound contained in the toner particle is determined on the basis of a $^{29}$Si-NMR (solid) measurement. The value obtained by multiplying the silicon ion normalized intensity (m/z 28) by its content ratio is then regarded as the intensity derived from the condensation product of an organosilicon compound.

Method for Measuring the Normalized Intensity of Silicon Ions Present Inside the Toner Particle Ordinarily, TOF-SIMS is a surface analysis method where data in the depth direction yields data for about 1 nm. Therefore, the intensity inside the toner is determined after sputtering the toner by an argon gas cluster ion beam (Ar-GCIB) and shaving of the surface.

After sputtering the toner particle under the conditions below, a silicon ion normalized intensity (m/z 28) measured in accordance with the same conditions as in "Method for Measuring the Normalized Intensity of Silicon Ions Present on the Toner Particle Surface" above is taken as the value of normalized intensity of silicon ions present inside the toner particle.

Sputtering conditions are as follows.

Acceleration voltage: 5 kV

Current: 6.5 nA

Raster size: 600×600 μm

Irradiation time: 5 sec/cycle

Sputtering time: 250 sec

Herein a PMMA film was sputtered beforehand under the same conditions, and cutting depth was checked; it was found that a depth of 80 nm was cut in 250 s.

Removal of Fine Particles of a Polyhydric Acid Metal Salt and the External Additive Herein 160 g of sucrose (by Kishida Chemical Co. Ltd.) are added to 100 mL of ion-exchanged water and dissolved therein while being warmed in a hot water bath to prepare a sucrose concentrate. Thereupon 31 g of this sucrose concentrate and 6 mL of Contaminon N (10 mass % aqueous solution of a pH-7 neutral detergent for cleaning of precision measuring instruments, comprising a nonionic surfactant, an anionic surfactant and an organic builder, by Wako Pure Chemical Industries, Ltd.) are introduced into a centrifuge tube to produce a dispersion. Then 1 g of toner is added to this dispersion and toner clumps are broken up using a spatula or the like.

The centrifuge tube is shaken in a shaker ("KM Shaker" by Iwaki Industry Co., Ltd.) for 30 minutes at 350 strokes per minute. After shaking, the resulting solution is transferred to a glass tube (50 mL) for swing rotors, and is centrifuged under conditions of 58.33 $S^{-1}$ for 30 minutes, using a centrifuge (H-9R, by Kokusan Co. Ltd.). In the glass tube after centrifugation, there are present the toner particle at the topmost layer, and an external additive such as fine particles of a polyhydric acid metal salt on the aqueous solution side of the lower layer.

The toner particle in the topmost layer is collected, filtered, and washed with 2 L of ion-exchanged water warmed to 40° C., and the washed toner particle is retrieved.

Method for Measuring the Number-Average Molecular Weight (Mn) and the Weight-Average Molecular Weight (Mw)

The number-average molecular weight (Mn) and weight average molecular weight (Mw) of the polymer, resin and the toner particle are measured by gel permeation chromatography (GPC) as follows.

Firstly, a sample to be measured is dissolved in tetrahydrofuran (THF) for 24 hours at room temperature. The obtained solution is then filtered through a solvent-resistant membrane filter "MYSYORI DISC" (by Tosoh Corporation) having a pore diameter of 0.2 μm, to yield a sample solution. The sample solution is adjusted so that the concentration of the THF-soluble component is about 0.8 mass %. A measurement is performed then under the conditions below using the sample solution.

Device: HLC8120 GPC (detector: RI) (by Tosoh Corporation)

Column: 7 columns Shodex KF-801, 802, 803, 804, 805, 806, 807 (by Showa Denko KK)

Eluent: tetrahydrofuran (THF)

Flow rate: 1.0 mL/min

Oven temperature: 40.0° C.

Sample injection amount: 0.10 mL

To calculate the molecular weight of the sample there is used a molecular weight calibration curve created using a standard polystyrene resin (product name "TSK STANDARD POLYSTYRENE F-850, F-450, F-288, F-128, F-80, F-40, F-20, F-10, F-4, F-2, F-1, A-5000, A-2500, A-1000 or A-500", by Tosoh Corporation).

Method for Extracting the Silane-Modified Resin R from the Toner Particle

The silane-modified resin R in the toner particle is retrieved by separating an extraction product in tetrahydrofuran (THF), in accordance with a solvent gradient elution method. The preparation method is as follows.

Herein 10.0 g of a toner particle is weighed, is placed in a cylindrical filter paper (No. 84, by Toyo Roshi Kaisha, Ltd.), and is set in a Soxhlet extractor. The solid obtained through extraction with 200 mL of THF as a solvent for 20 hours, and removal of the solvent from the resulting extract, is a THF-soluble matter. This THF-soluble matter contains the silane-modified resin R. The above operation is carried out multiple times to obtain the required amount of THF-soluble matter.

Gradient preparative HPLC (LC-20AP high-pressure gradient preparative system manufactured by Shimadzu Corporation, SunFire preparative column 50 mmφ 250 mm manufactured by Waters Co., Ltd.) is used for the solvent gradient elution method. The column temperature is 30° C., the flow rate is 50 mL/min, acetonitrile is used as a poor solvent for the mobile phase, and THF is used as a good solvent. A solution obtained by dissolving 0.02 g of the THF-soluble matter obtained by the extraction in 1.5 mL of THF is used as a sample for separation.

The mobile phase starts with a composition of 100% acetonitrile, and after 5 min from the sample injection, the ratio of THF is increased by 4% every minute, and the composition of the mobile phase is made 100% THF over 25 min. The components can be separated by drying the obtained fraction. As a result, the resin R can be obtained. Which fraction component is the resin R can be determined by measurement of the content of silicon atoms and $^{13}C$-NMR measurement described hereinbelow.

Ascertainment of the Structure of the Condensation Product of an Organosilicon Compound The functional groups included in the condensation product of an organosilicon compound and the structures of the polymer segment $P^1$ and $L^1$ segment and the $R^1$ to $R^3$ segments in the structure represented by Formula (1) were ascertained by $^1H$-NMR analysis, $^{13}C$-NMR analysis, $^{29}Si$-NMR analysis and FT-IR analysis.

In a case where the condensation product of an organosilicon compound is a silane-modified resin R, the measurement sample that is used is the synthesized silane-modified resin R or the silane-modified resin R extracted from the toner particle in accordance with the above extraction method. In a case where the condensation product of an organosilicon compound is a condensation product of a silane coupling agent, there is used a THF-insoluble matter of the toner particle.

In a case where the silicon atom is bonded to an alkoxy group or hydroxy group among $R^1$ to $R^3$ in the structure represented by Formula (1), the valence of the alkoxy group or hydroxy group relative to the silicon atom can be determined in accordance with the method illustrated in "$^{29}Si$-NMR (Solid) Measurement Conditions" below.

$^{29}Si$-NMR (Solid) Measurement Conditions

Apparatus: JNM-ECX500II by JEOL RESONANCE Co., Ltd.

Sample tube: 3.2 mmφ

Sample amount: 150 mg

Measurement temperature: room temperature

Pulse mode: CP/MAS

Measured nucleus frequency: 97.38 MHz ($^{29}Si$)

Reference substance: DSS (external standard: 1.534 ppm)

Sample rotational speed: 10 kHz

Contact time: 10 ms

Delay time: 2 s

Number of scans: 2000 to 8000

As a result of the above measurement, an abundance ratio can be worked out through peak separation/integration by curve fitting of a plurality of silane components according to the number of oxygen atoms bonded to Si. The valence of the alkoxy group or hydroxy group in the $R^1$ to $R^3$ of the resin represented by Formula (1) relative to the silicon atoms can be ascertained in this manner.

A compound having at least one of an M unit, a D unit or a T unit structure below can be regarded as a condensation product of an organosilicon compound. A compound having a Q unit structure below can be regarded as a silicon compound other than a condensation product of an organosilicon compound.

In the structures below, at least one of R in each unit is a carbon atom. The other R is an arbitrary group; for instance, the other R represents a hydrogen atom, a halogen atom, an alkyl group having 1 or more carbon atoms, an alkoxy group having 1 or more carbon atoms, an aryl group having 6 or more carbon atoms, or a hydroxy group, similarly to $R^1$ to $R^3$ in Formula (1).

M unit

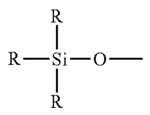

D unit

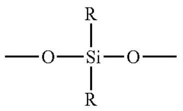

T unit

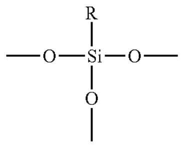

Q unit

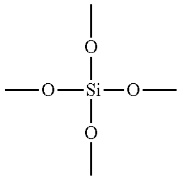

The structures of $P^1$, $L^1$, and $R^1$ to $R^3$ in the silane-modified resin R represented by Formula (1) can be ascertained on the basis of a $^{13}$C-NMR (solid) measurement. The measurement conditions are as follows.

$^{13}$C-NMR (Solid) Measurement Conditions

Apparatus: JNM-ECX500II by JEOL RESONANCE Co., Ltd.

Sample tube: 3.2 mmφ

Sample amount: 150 mg

Measurement temperature: room temperature

Pulse mode: CP/MAS

Measured nucleus frequency: 123.25 MHz ($^{13}$C)

Reference substance: adamantane (external standard: 29.5 ppm)

Sample rotational speed: 20 kHz

Contact time: 2 ms

Delay time: 2 s

Number of scans: 1024

Various peaks are separated according to the types of $P^1$, $L^1$, and $R^1$ to $R^3$ in Formula (1), and the peaks are identified to determine the types of $P^1$, $L^1$ and $R^1$ to $R^3$.

Measurement of Polymerization Conversion Ratio of Polymerizable Monomers

The polymerization conversion ratio of a polymerizable monomer can be measured by gas chromatography (GC) as follows.

Herein 2.55 mg of DMF (dimethylformamide) are added to 100 ml of acetone to prepare an internal standard-containing solvent. Next, 0.2 g of a polymerizable monomer composition dispersion is weighed exactly and a 10 ml solution is prepared with the above solvent. The solution is shaken for 30 minutes in an ultrasonic shaker, and is thereafter allowed to stand for 1 hour. The solution is then filtered through a 0.5 μm membrane filter, and 4 μl of the resulting filtrate is analyzed by gas chromatography.

A calibration curve is created beforehand, and the mass ratio/area ratio of a polymerizable monomer and the internal standard DMF is worked out. The amount of unreacted polymerizable monomer is calculated from the obtained chromatogram to determine the polymerization conversion ratio.

The measuring device and measuring conditions are as follows.

GC: GC-14A by Shimadzu Corporation

Column: J&W Scientific, Inc., DB-WAX (249 μm×0.25 μm×30 m)

Carrier gas: N2

Oven: (1) holding at 70° C. for 2 minutes; (2) heating up to 220° C. at 5° C./minute Injection port: 200° C.

Split ratio: 1:20

Detector: 200° C. (FID)

Measurement of Total Content of Ca and Mg Elements in the Toner Particle

The total content of Ca and Mg elements derived from the dispersing agent or the like is quantified using an inductively coupled plasma atomic emission spectrometer (ICP-AES (by Seiko Instruments Inc.)).

As a pretreatment, acid decomposition is performed using 8.00 ml of 60% nitric acid (by Kanto Chemical Co., Inc.; for atomic absorption spectroscopy) in 100.0 mg of the toner particle.

Acid decomposition involves a treatment in a sealed container at an internal temperature of 220° C. for 1 hour using a microwave high-power sample pretreatment device ETHOS 1600 (by Milestone Srl), to prepare a multivalent metal element-containing solution sample.

Ultrapure water is thereafter added to bring the total amount to 50.00 g to yield a measurement sample. A calibration curve is created for each multivalent metal element, and the amount of metal contained in each sample is quantified. Also, ultrapure water is added to 8.00 ml of nitric acid to a total of 50.00 g, and the resulting solution is measured as a blank; the amount of metal in the blank is then deducted.

EXAMPLES

The present invention will be explained next in further detail with reference to examples and comparative examples, but the present invention is not limited thereto.

Unless particularly noted otherwise, the language "parts" refers to mass basis in all instances.

Production Example of Resin R1

The following materials were charged into an autoclave equipped with a pressure-reducing device, a water separating device, a nitrogen gas introduction device, a temperature measuring device and a stirring device, and a reaction was conducted at 200° C. for 20 hours in a nitrogen atmosphere at normal pressure.

Alcohol component: 80.9 parts (2.0 mole adduct of bisphenol A-propylene oxide)

Acid component 1 (terephthalic acid): 16.1 parts

Acid component 2 (isophthalic acid): 16.1 parts

Tetrabutoxytitanate: 0.2 parts

Thereafter the following materials were added, and the reaction was allowed to proceed for 3 hours at 220° C.

Acid or alcohol component 3 (trimellitic acid): 0.4 parts

Tetrabutoxytitanate: 0.3 parts

The reaction was further carried out for 2 hours under reduced pressure in the range from 10 to 20 mmHg. The obtained resin was dissolved in chloroform, and the resulting solution was added dropwise to ethanol with reprecipitation and filtration to yield a polyester resin.

The carboxy group in the obtained polyester resin and the amino group in an aminosilane were amidated to produce Resin R1 as follows.

Herein 100.0 parts of the above polyester were dissolved in 400.0 parts of N,N-dimethylacetamide, and the following materials were added with stirring for 5 hours at normal temperature. Once the reaction was over, this solution was added dropwise to methanol with reprecipitation and filtration to yield Resin R1.

Silane compound (3-aminopropyltrimethoxysilane): 0.2 parts

Triethylamine: 0.3 parts

Condensation agent (amidating agent): 0.3 parts

DMT-MM: 4-(4,6-dimethoxy-1,3,5-triazine-2-yl)-4-methylmorpholinium chloride

Table 1 sets out the structure and physical properties of the obtained Resin R1.

Production Example of Resin R2

The following materials were charged into an autoclave equipped with a pressure-reducing device, a water separating device, a nitrogen gas introduction device, a temperature measuring device and a stirring device, and a reaction was conducted at 200° C. for 5 hours in a nitrogen atmosphere at normal pressure.

Alcohol component: 93.2 parts (2.0 mole adduct of bisphenol A-propylene oxide)

Acid component 1 (terephthalic acid): 11.2 parts

Acid component 2 (isophthalic acid): 11.2 parts

Tetrabutoxytitanate: 0.2 parts

Thereafter the following materials were added, and the reaction was allowed to proceed for 3 hours at 220° C.

Tetrabutoxytitanate: 0.3 parts

The reaction pressure, reaction temperature and reaction time were adjusted as appropriate in order to obtain a lower molecular weight product.

The carboxy group in the obtained polyester and the amino group in an aminosilane were amidated to produce Resin R2 as follows.

Herein 100.0 parts of the above polyester were dissolved in 400.0 parts of N,N-dimethylacetamide, and the following materials were added with stirring for 5 hours at normal temperature. Once the reaction was over, the resulting solution was added dropwise to methanol with reprecipitation and filtration to yield Resin R2.

Silane compound (3-aminopropylmethyldimethoxysilane): 1.2 parts

Triethylamine: 2.4 parts

Condensation agent (amidating agent): 2.4 parts

DMT-MM: 4-(4,6-dimethoxy-1,3,5-triazine-2-yl)-4-methylmorpholinium chloride

Table 1 sets out the structure and physical properties of the obtained Resin R2.

Production Examples of Resins R3 to R5 and Resin R7

Resins R3 to R5 and Resin R7 were obtained in the same way as in the production example of Resin R2, except that the silane compound, triethylamine and condensation agent in the production example of Resin R2 were modified as given in Table 1.

Table 1 sets out the structure and physical properties of the obtained resins.

Production Example of Resin R6

Herein 100.0 parts of propylene glycol monomethyl ether were heated while under nitrogen purging, and were refluxed at a liquid temperature of 120° C. or higher. Then, a mixture of the following materials was added dropwise over 3 hours.

Styrene: 64.1 parts

Butyl acrylate: 30.9 parts

Acrylic acid: 5.0 parts tert-butyl peroxybenzoate: 1.0 part (organic peroxide-based polymerization initiator, by NOF Corporation, product name: Perbutyl Z)

Once dropping was over, the solution was stirred for 3 hours, followed by atmospheric distillation while the liquid temperature was raised up to 170° C. Once the liquid temperature reached 170° C., the pressure was reduced to 1 hPa, with distillation for 1 hour to remove the solvent and yield a resin solid product. The resin solid product was dissolved in tetrahydrofuran, and was reprecipitated with n-hexane; the precipitated solid was then filtered off to yield a styrene acrylic resin.

The carboxy group in the obtained styrene acrylic resin and the amino group in an aminosilane were amidated to produce Resin R6 as follows.

Herein 100.0 parts of the above styrene acrylic acid copolymer were dissolved in 400.0 parts of N, N-dimethylacetamide, and the following materials were added with stirring for 5 hours at normal temperature. Once the reaction was over, this solution was added dropwise to methanol with reprecipitation and filtration to yield Resin R6.

Silane compound (3-aminopropyltrimethylsilane): 1.0 part

Triethylamine: 2.7 parts

Condensation agent: 2.7 parts

DMT-MM: 4-(4,6-dimethoxy-1,3,5-triazine-2-yl)-4-methylmorpholinium chloride

Table 1 sets out the structure and physical properties of the obtained Resin R6.

TABLE 1

| Resin type | Starting resin Polymer segment P1 | Modified silane compound silane compound starting material | Number of parts | Triethyl-amine (parts) | Condensation agent DMTMM (parts) | Properties of silane-modified resin $R^1$ | $R^2$ | $R^3$ | $L^1$ | Mw |
|---|---|---|---|---|---|---|---|---|---|---|
| R1 | BPA(PO) + TPA/IPA | 3-aminopropyltrimethoxysilane | 0.2 | 0.3 | 0.3 | —OMe | —OMe | —OMe | —CONHR[5]— | 99651 |
| R2 | BPA(PO) + TPA/IPA | 3-aminopropylmethyldimethoxysilane | 1.2 | 2.4 | 2.4 | —OMe | —OMe | —Me | —CONHR[5]— | 20036 |
| R3 | BPA(PO) + TPA/IPA | 3-aminopropyldimethylmethoxysilane | 1.1 | 2.4 | 2.4 | —OMe | —Me | —Me | —CONHR[5]— | 20082 |
| R4 | BPA(PO) + TPA/IPA | 3-aminopropyltrimethoxysilane | 1.3 | 2.4 | 2.4 | —OMe | —OMe | —OMe | —CONHR[5]— | 20164 |
| R5 | BPA(PO) + TPA/IPA | 3-aminopropyltriethoxysilane | 1.6 | 2.5 | 2.5 | —OEt | —OEt | —OEt | —CONHR[5]— | 20117 |
| R6 | St/BA/AA | 3-aminopropyltrimethylsilane | 1.0 | 2.7 | 2.7 | —Me | —Me | —Me | —CONHR[5]— | 18111 |
| R7 | BPA(PO) + TPA/IPA | 3-aminopropyltrimethylsilane | 1.0 | 1.0 | 2.3 | —Me | —Me | —Me | —CONHR[5]— | 20052 |

In the table, P1, L1 and R1 to R3 correspond to $P^1$, $L^1$ and $R^1$ to $R^3$ in Formula (1). In the table, R5 corresponds to $R^5$ in Formula (2) and denotes a propyl group. Further, Me denotes a methyl group, and Et denotes an ethyl group.

The abbreviations in the tables are as follows.

BPA(PO): 2.0 mole adduct of bisphenol A-propylene oxide

TPA: terephthalic acid

IPA: isophthalic acid

St: styrene

BA: butyl acrylate

AA: acrylic acid

Production Example of Toner Particle 1

Preparation of Polymerizable Monomer Composition 1

| | |
|---|---|
| Styrene | 60.0 parts |
| C. I. Pigment Blue 15:3 | 6.3 parts |

The above materials were charged into an attritor (by Nippon Coke & Engineering Co., Ltd.), and dispersion was carried out for 5.0 hours at 220 rpm using zirconia particles having a diameter of 1.7 mm, after which the zirconia particles were removed to yield a colorant-dispersed solution having a pigment dispersed therein.

Then, the materials below were added to the above colorant-dispersed solution.

| | |
|---|---|
| Styrene | 15.0 parts |
| n-butyl acrylate | 25.0 parts |
| Hexanediol diacrylate | 0.5 parts |
| Polyester resin | 5.0 parts |

(condensation polymerization product of terephthalic acid and a propylene oxide 2-mol adduct of bisphenol A; weight-average molecular weight Mw of 10000; acid value of 8.2 mgKOH/g)

| | |
|---|---|
| Release agent (hydrocarbon wax; melting point: 79° C.) | 5.0 parts |
| Plasticizer (ethylene glycol distearate) | 15.0 parts |

As a dissolution/dispersion step, the above materials were next kept warm at 65° C. and were dissolved and dispersed uniformly at 500 rpm using T. K. Homomixer to prepare a polymerizable monomer composition.

Preparation of Aqueous Medium 1

Herein 11.2 parts of sodium phosphate (dodecahydrate) were charged into a reaction vessel containing 390.0 parts of ion-exchanged water, and the whole was kept warm at 65° C. for 1.0 hour while under purging with nitrogen. Stirring was carried out at 12000 rpm using T. K. Homomixer (by Tokushu Kika Kogyo Co., Ltd.). While maintaining stirring, an aqueous solution of calcium chloride resulting from dissolution of 7.4 parts of calcium chloride (dihydrate) in 10.0 parts of ion-exchanged water, were charged into the reaction vessel all at once to prepare an aqueous medium that contained a dispersion stabilizer. Then 1.0 mol/L hydrochloric acid was added to the aqueous medium in the reaction vessel to adjust pH to 6.0 and prepare thus Aqueous medium 1.

Granulating Step

While the temperature of Aqueous medium 1 was maintained at 70° C. and the rotational speed of the stirring device at 12500 rpm, the polymerizable monomer composition was charged in Aqueous medium 1 with addition of 8.0 parts of t-butyl peroxypivalate as a polymerization initiator. Granulation was performed for 10 minutes while maintaining 12500 rpm in the stirring device as it was.

Polymerization Step A

The high-speed stirring device was modified to a stirrer equipped with a propeller stirring blade, and polymerization was carried out for 5.0 hours by holding the temperature at 70° C. and while under stirring at 200 rpm.

Polymerization Step B

Subsequently to polymerization step A, a polymerization reaction was conducted by further raising the temperature to 85° C. and by heating for 2.0 hours. Then 0.03 parts of 3-methacryloxypropyltrimethoxysilane (M1) were added with stirring for 5 minutes, after which a 1 mol/L aqueous solution of sodium hydroxide was added to adjust pH to 9.0.

The residual monomer was removed by raising the temperature to 98° C. and by heating for 3.0 hours. Thereafter, the temperature was lowered to 55° C., and this temperature was held for 5.0 hours while maintaining stirring. The temperature was then lowered to 25° C. Ion-exchanged water was added to adjust the concentration of the toner particle in the dispersion to 30.0%, and yield Toner particle dispersion 1 having Toner particle 1 dispersed therein.

Washing Step

Toner particle dispersion 1 was adjusted to pH of 1.5 using 1 mol/L hydrochloric acid, with stirring for 1.0 hour, followed by filtration while under washing with ion-exchanged water, and by drying, to yield Toner particle 1.

The silane compounds used are given in Table 2, and the physical properties of the obtained Toner particle 1 are given in Table 3.

Production Example of Toner Particle 2

Toner particle 2 was then obtained in the same way as in the production example of Toner particle 1, except that the addition amount of 3-methacryloxypropyltrimethoxysilane (M1) in the production example of Toner particle 1 was modified to 0.01 parts.

The silane compounds used are given in Table 2, and the physical properties of the obtained Toner particle 2 are given in Table 3.

Production Example of Toner Particle 3

A mixed solution of 15.0 parts of ion-exchanged water having had the pH thereof adjusted to 4.0 through addition of 1 mol/L hydrochloric acid, and 0.15 parts of 3-methacryloxypropyltrimethoxysilane (M1), was mixed using a stirrer until a uniform phase was formed to yield thereby Monomer hydrolysis solution 1.

Toner particle 3 was then obtained in the same way as in the production example of Toner particle 1, except that herein once the polymerization step A in the production example of Toner particle 1 was over, the entire amount of Monomer hydrolysis solution 1 was added with stirring for 5 minutes, followed by adjustment of the pH to 9.0 through addition of a 1 mol/L aqueous solution of sodium hydroxide, and except that no 3-methacryloxypropyltrimethoxysilane (M1) was added in the polymerization step B.

The silane compounds used are given in Table 2, and the physical properties of the obtained Toner particle 3 are given in Table 3.

Production Example of Toner Particle 4

Toner particle 4 was then obtained in the same way as in the production example of Toner particle 1, except that herein once the polymerization step A in the production example of Toner particle 1 was over, 0.15 parts of 3-methacryloxypropyltrimethoxysilane (M1) were added with stirring for 5 minutes, followed by adjustment of the pH to 9.0 through addition of a 1 mol/L aqueous solution of sodium hydroxide, and except that no 3-methacryloxypropyltrimethoxysilane (M1) was added in the polymerization step B.

The silane compounds used are given in Table 2, and the physical properties of the obtained Toner particle 4 are given in Table 3.

Production Example of Toner Particle 5

A mixed solution of 0.03 parts of ion-exchanged water having had the pH thereof adjusted to 4.0 through addition of 1 mol/L hydrochloric acid, and 0.02 parts of methyltrimethoxysilane (M7), was mixed using a stirrer until a uniform phase was formed to yield thereby Monomer hydrolysis solution 2.

Toner particle 5 was then obtained in the same way as in the production example of Toner particle 2, except that herein the entire amount of the Monomer hydrolysis solution 2 was added immediately after the temperature was lowered to 55° C. in the production example of Toner particle 2.

The silane compounds used are given in Table 2, and the physical properties of the obtained Toner particle 5 are given in Table 3.

Production Example of Toner Particle 6

Toner particle 6 was then obtained in the same way as in the production example of Toner particle 1, except that herein 0.01 parts of 3-methacryloxypropyltrimethoxysilane (M1) in the production example of Toner particle 1 were modified to 0.40 parts of 3-methacryloxypropyltris(trimethylsiloxy)silane (M2).

The silane compounds used are given in Table 2, and the physical properties of the obtained Toner particle 6 are given in Table 3.

Production Example of Toner Particle 7

Toner particle 7 was then obtained in the same way as in the production example of Toner particle 6, except that herein after addition of 3-methacryloxypropyltris(trimethylsiloxy)silane (M2) in the production example of Toner particle 6, the stirring time until adjustment of the pH to 9.0 was modified to 60 minutes.

The silane compounds used are given in Table 2, and the physical properties of the obtained Toner particle 7 are given in Table 3.

Production Example of Toner Particle 8

Toner particle 8 was then obtained in the same way as in the production example of Toner particle 6 except that herein addition of 0.40 parts of 3-methacryloxypropyltris(trimethylsiloxy)silane (M2) in the production example of Toner particle 6 was modified to after lowering of the temperature to 55° C. in the polymerization step B, and except that this addition was followed by 60 minutes of stirring, and subsequent addition of a 1 mol/L aqueous solution of sodium hydroxide to adjust pH to 9.0, the temperature of 55° C. being thereafter held for 4.0 hours while stirring was maintained.

The silane compounds used are given in Table 2, and the physical properties of the obtained Toner particle 8 are given in Table 3.

Production Examples of Toner Particles 9 to 12

Toner particles 9 to 12 were obtained in the same way as in production example of Toner particle 1, except that 3-methacryloxypropyltrimethoxysilane (M1) in the production example of Toner particle 1 was modified as given in Table 3.

The silane compounds used are given in Table 2, and the physical properties of the obtained Toner particles 9 to 12 are given in Table 3.

Production Example of Toner Particle 13

Preparation of Aqueous Medium 2

Herein 10.2 parts of magnesium chloride were charged into a reaction vessel containing 250.0 parts of ion-exchanged water, and the whole was kept warm at 65° C. for 1.0 hour while under purging with nitrogen. Stirring was carried out at 12000 rpm using T. K. Homomixer (by Tokushu Kika Kogyo Co., Ltd.). While maintaining stirring, an aqueous solution of calcium chloride, resulting from dissolution of 6.2 parts of calcium chloride in 50.0 parts of ion-exchanged water, were charged into the reaction vessel all at once to prepare an aqueous medium that contained a dispersion stabilizer. Then 1.0 mol/L hydrochloric acid was added to the aqueous medium in the reaction vessel to adjust pH to 6.0 and prepare thus Aqueous medium 2.

Then Toner particle 13 was then obtained in the same way as in the production example of Toner particle 1, except that herein Aqueous medium 1 in the production example of Toner particle 1 was modified to Aqueous medium 2.

The silane compounds used are given in Table 2, and the physical properties of the obtained Toner particle 13 are given in Table 3.

Production Example of Toner Particle 14

Toner particle 14 was obtained in the same way as in production example of Toner particle 13, except that the amount of magnesium chloride in the production example of Toner particle 13 was modified to 12.2 parts. Table 3 sets out the physical properties of the obtained Toner particle 14.

Production Example of Toner Particle 15

Toner particle 15 was then obtained in the same way as in the production example of Toner particle 1, except that 5.0 parts of polyester resin in the production example of Toner particle 1 were modified to 4.5 parts of polyester resin and 1.00 part of Resin R1. Table 3 sets out the physical properties of the obtained Toner particle 15.

Production Example of Toner Particles 16 to 21 and 25

Toner particles 16 to 21 and 25 were obtained in the same way as in the production example of Toner particle 15, except that the Resin R1 in the production example of Toner particle 15 was modified to any of Resins R2 to R7 in the amount of parts as given in Table 3. Table 3 sets out the physical properties of the obtained Toner particles 16 to 21 and 25.

Production Example of Toner Particle 22

Preparation of a Binder Resin Particle Dispersion

Herein 89.5 parts of styrene, 9.2 parts of butyl acrylate, 1.3 parts of acrylic acid as a carboxy group-imparting monomer, and 3.2 parts of n-lauryl mercaptan were mixed and dissolved. An aqueous solution resulting from dissolving 1.5 parts of Neogen RK (by DKS Co., Ltd.) in 150 parts of ion-exchanged water was added to the above solution with dispersion.

An aqueous solution obtained by dissolving 0.3 parts of potassium persulfate in 10 parts of ion-exchanged water was further added, while under slow stirring for 10 minutes. After nitrogen replacement, emulsion polymerization was carried out at 70° C. for 6 hours. Once polymerization was over, the reaction solution was cooled down to room temperature, and ion-exchanged water was added, to thereby yield a binder resin particle dispersion having a solids concentration of 12.5 mass % and a volume-basis median size of 0.2 μm.

The binder resin that made up the resin particles had a carboxy group derived from acrylic acid. The glass transition temperature of the binder resin was 57° C.

Preparation of a Wax Dispersion

Herein 100 parts of a diester compound (ethylene glycol distearate), 30 parts of paraffin wax "HNP-9" (by Nippon Seiro Co., Ltd.; melting point 75° C.) as a release wax, and 20 parts of Neogen RK were mixed with 400 parts of ion-exchanged water. The resulting mixture was thereafter dispersed for about 1 hour using a wet-type jet mill JN 100 (by Jokoh Co., Ltd.) to yield a wax dispersion.

Preparation of a Colorant-Dispersed Solution

Herein C. I. Pigment Blue 15:3 (100 parts) as a colorant and 15 parts of Neogen RK were mixed with 885 parts of ion-exchanged water, and the resulting mixture was dispersed for about 1 hour using a wet-type jet mill JN 100 to yield a colorant-dispersed solution.

Then 265 parts of the obtained binder resin particle dispersion, 80 parts of the wax dispersion, and 10 parts of the colorant-dispersed solution were dispersed using a homogenizer (Ultra-Turrax T50, by IKA K.K.). The temperature inside the vessel was adjusted to 30° C. while under stirring, and pH was adjusted to 8.0 through addition of a 1 mol/L aqueous solution of sodium hydroxide.

An aqueous solution resulting from dissolving 0.5 parts of magnesium chloride in 10 parts of ion-exchanged water was added, as a flocculant, over 10 minutes while under stirring at 30° C. Warming up was initiated after 3 minutes of standing, and the temperature was raised up to 50° C. to generate of aggregated particles. In that state, the particle diameter of the aggregated particles was measured using "Coulter Counter Multisizer 3" (registered trademark, by Beckman Coulter Inc.). When the weight-average particle diameter reached 6.5 μm, 3.0 parts of sodium chloride and 8.0 parts of Neogen RK were added to stop particle growth.

Thereafter, the particles were warmed up to 95° C., and stirring was maintained in that state, to carry out melt adhesion and spherification of the aggregated particles. When average circularity reached 0.980, the particles were cooled down to 80° C. and cooling was maintained at 80° C. Ice water was then added thereby to cool from a cooling start temperature of 80° C. down to a cooling end temperature of 30° C., at a cooling rate of 3° C./sec.

The temperature was then raised again up to 55° C. with addition of 0.40 parts of 3-methacryloxypropyltris(trimethylsiloxy)silane (M2) and stirring for 60 minutes. Thereafter, pH was adjusted to 9.0 through addition of a 1 mol/L aqueous solution of sodium hydroxide, and the temperature was held at 55° C. for 4.0 hours while stirring was maintained, followed by cooling down to 25° C. to yield Toner particle dispersion 22.

The pH of the obtained Toner particle dispersion 22 was adjusted to pH of 1.5 using 1 mol/L hydrochloric acid with stirring for 1.0 hour, followed by filtration while under washing with ion-exchanged water, and by drying, to yield Toner particle 22.

The silane compounds used are given in Table 2, and the physical properties of the obtained Toner particle 22 are given in Table 3.

Production Example of Toner Particle 23

Binder resin (copolymer of styrene-n-butyl acrylate): 100.0 parts [styrene-n-butyl acrylate copolymerization ratio (mass ratio) of 75:25, peak molecular weight (Mp) of 22000, weight-average molecular weight (Mw) of 35000, Mw/Mn=2.4, where Mn represents number-average molecular weight.]

| | |
|---|---|
| C. I. Pigment Blue 15:3 | 6.3 parts |
| Release agent (hydrocarbon wax; melting point 79° C.) | 5.0 parts |
| Plasticizer (ethylene glycol distearate) | 5.0 parts |

The above materials were pre-mixed using FM mixer (by Nippon Coke & Engineering Co., Ltd.), and were then melt-kneaded using a twin-screw kneading extruder (PCM-30, by Ikegai Corp.), to obtain a kneaded product. The obtained kneaded product was cooled, was coarsely pulverized with a hammer mill (by Hosokawa Micron Corporation), and was then pulverized with a mechanical pulverizer (T-250, by Turbo Kogyo Co., Ltd.), to yield a finely pulverized powder.

The obtained finely pulverized powder was re-slurried in Aqueous medium 1 to yield a dispersion once more, after which the temperature was raised again up to 55° C. This was followed by addition of 0.40 parts of 3-methacryloxypropyltris(trimethylsiloxy)silane (M2), and stirring for 60 minutes. Thereafter, pH was adjusted to 9.0 through addition of a 1 mol/L aqueous solution of sodium hydroxide, and the temperature was held at 55° C. for 4.0 hours while stirring was maintained, followed by cooling down to 25° C., to yield Toner particle dispersion 23.

The pH of the obtained Toner particle dispersion 23 was adjusted to pH of 1.5 using 1 mol/L hydrochloric acid, with stirring for 1.0 hour, followed by filtration while under washing with ion-exchanged water, and by drying, to yield Toner particle 23.

The silane compounds used are given in Table 2, and the physical properties of the obtained Toner particle 23 are given in Table 3.

Production Example of Toner Particle 24

Toner particle 24 was obtained in the same way as in the production example of Toner particle 3, except that 3-methacryloxypropyltrimethoxysilane (M1) in the production example of Toner particle 3 was modified to 0.50 parts.

The silane compounds used are given in Table 2, and the physical properties of the obtained Toner particle 24 are given in Table 3.

Production Example of Toner Particle 26

Toner particle 26 was obtained in the same way as in the production example of Toner particle 1, except that no 3-methacryloxypropyltrimethoxysilane (M1) was added in the polymerization step B of the production example of Toner particle 1.

The physical properties of the obtained Toner particle 26 are given in Table 3. The normalized intensity of the Toner particle 26 in Table 3 is a numerical value derived from base intensity.

Production Example of Toner Particle 27

Toner particle 27 was then obtained in the same way as in the production example of Toner particle 24, except that the 3-methacryloxypropyltrimethoxysilane (M1) in the production example of Toner particle 24 was modified to 0.40 parts of 3-methacryloxypropyltris(trimethylsiloxy)silane (M2).

The silane compounds used are given in Table 2, and the physical properties of the obtained Toner particle 27 are given in Table 3.

Production Example of Toner Particle 28

Toner particle 28 was then obtained in the same way as in the production example of Toner particle 1, except that 0.03 parts of silica particles (Snowtex PS (by Nissan Chemical Corporation)) were added in the preparation of the Polymerizable monomer composition 1 in the production example of Toner particle 1, and except that no 3-methacryloxypropyltrimethoxysilane (M1) was added in the polymerization step B.

The physical properties of the obtained Toner particle 28 are given in Table 3.

TABLE 2

| Monomer type | Silane compound starting material |
|---|---|
| M1 | 3-methacryloxypropyltrimethoxysilane |
| M2 | 3-methacryloxypropyltris(trimethylsiloxy)silane |
| M3 | 3-methacryloxypropylmethyldimethoxysilane |
| M4 | 3-methacryloxyoctyltrimethoxysilane |
| M5 | 3-methacryloxypropyltriethoxysilane |
| M6 | 3-acryloxypropyltrimethoxysilane |
| M7 | Methyltrimethoxysilane |

TABLE 3

| Toner particle No. | Si source: Si source 1 | Si source: Si source 2 | Number of parts: Si source 1 (parts) | Number of parts: Si source 2 (parts) | Si source addition step | Wait time until increase in pH after addition of Si source | Conversion ratio upon addition of Si source (from reaction step onwards) (%) | D4 |
|---|---|---|---|---|---|---|---|---|
| 1 | M1 | — | 0.03 | — | Polymerization step B | 5 min | 98.9 | 6.5 μm |
| 2 | M1 | — | 0.01 | — | Polymerization step B | 5 min | 99.1 | 6.4 μm |
| 3 | M1 | — | 0.15 | — | Polymerization step A | 5 min | 97.9 | 6.7 μm |
| 4 | M1 | — | 0.15 | — | Polymerization step A | 5 min | 97.3 | 6.7 μm |
| 5 | M1 | M7 | 0.01 | 0.02 | Polymerization step B | 5 min | 99.1 | 6.4 μm |
| 6 | M2 | — | 0.40 | — | Polymerization step B | 5 min | 99.2 | 6.5 μm |
| 7 | M2 | — | 0.40 | — | Polymerization step B | 60 min | 99.0 | 6.4 μm |
| 8 | M2 | — | 0.40 | — | After lowering of temperature to 55° C. | 60 min | 99.9 | 6.4 μm |

TABLE 3-continued

| | | | | | | | | |
|---|---|---|---|---|---|---|---|---|
| 9 | M3 | — | 0.03 | — | Polymerization step B | 5 min | 99.1 | 6.6 μm |
| 10 | M4 | — | 0.03 | — | Polymerization step B | 5 min | 99.2 | 6.5 μm |
| 11 | M5 | — | 0.03 | — | Polymerization step B | 5 min | 98.9 | 6.7 μm |
| 12 | M6 | — | 0.03 | — | Polymerization step B | 5 min | 98.9 | 6.7 μm |
| 13 | M1 | — | 0.03 | — | Polymerization step B | 5 min | 99.2 | 6.6 μm |
| 14 | M1 | — | 0.03 | — | Polymerization step B | 5 min | 99.1 | 6.5 μm |
| 15 | Resin R1 | — | 1.00 | — | Dissolution/dispersion step | — | — | 6.8 μm |
| 16 | Resin R2 | — | 0.50 | — | Dissolution/dispersion step | — | — | 6.8 μm |
| 17 | Resin R3 | — | 0.50 | — | Dissolution/dispersion step | — | — | 6.7 μm |
| 18 | Resin R4 | — | 0.50 | — | Dissolution/dispersion step | — | — | 6.7 μm |
| 19 | Resin R5 | — | 0.50 | — | Dissolution/dispersion step | — | — | 6.6 μm |
| 20 | Resin R6 | — | 0.50 | — | Dissolution/dispersion step | — | — | 6.6 μm |
| 21 | Resin R7 | — | 0.50 | — | Dissolution/dispersion step | — | — | 6.5 μm |
| 22 | M2 | — | 0.40 | — | After rise of temperature to 55° C. | 60 min | 99.9 | 6.5 μm |
| 23 | M2 | — | 0.40 | — | After rise of temperature to 55° C. | 60 min | 99.9 | 6.3 μm |
| 24 | M1 | — | 0.50 | — | Polymerization step A | 5 min | 97.9 | 6.5 μm |
| 25 | Resin R1 | — | 3.00 | — | Dissolution/dispersion step | — | — | 6.6 μm |
| 26 | — | — | — | — | None | — | — | 6.6 μm |
| 27 | M2 | — | 0.40 | — | Polymerization step ① | 5 min | 97.9 | 6.6 μm |
| 28 | Silica particles | — | 0.03 | — | None | — | — | 6.7 μm |

| Toner particle No. | Average circularity | Tg | Metal derived from dispersing agent | Amount of metal derived from dispersing agent μmol/g | Presence/absence of condensation | Silicon ion normalized intensity *1 | Silicon ion normalized intensity *2 |
|---|---|---|---|---|---|---|---|
| 1 | 0.982 | 55° C. | Ca | 4.0 | Present | 2.11.E−03 | 5.49.E−04 |
| 2 | 0.983 | 55° C. | Ca | 4.3 | Present | 7.17.E−04 | 5.10.E−04 |
| 3 | 0.978 | 55° C. | Ca | 4.4 | Present | 2.04.E−02 | 4.51.E−04 |
| 4 | 0.977 | 55° C. | Ca | 4.0 | Present | 2.61.E−03 | 2.30.E−04 |
| 5 | 0.985 | 55° C. | Ca | 4.2 | Present | 1.52.E−03 | 4.10.E−04 |
| 6 | 0.985 | 55° C. | Ca | 4.1 | Present | 8.20.E−04 | 2.08.E−04 |
| 7 | 0.981 | 55° C. | Ca | 4.0 | Present | 6.81.E−03 | 6.87.E−04 |
| 8 | 0.984 | 55° C. | Ca | 4.5 | Present | 1.68.E−02 | 6.10.E−04 |
| 9 | 0.981 | 55° C. | Ca | 4.4 | Present | 1.06.E−03 | 4.27.E−04 |
| 10 | 0.983 | 55° C. | Ca | 4.0 | Present | 8.62.E−04 | 5.53.E−04 |
| 11 | 0.982 | 55° C. | Ca | 4.3 | Present | 1.93.E−03 | 4.34.E−04 |
| 12 | 0.982 | 55° C. | Ca | 4.1 | Present | 2.04.E−03 | 4.93.E−04 |
| 13 | 0.981 | 55° C. | Mg | 20.0 | Present | 2.42.E−03 | 5.06.E−04 |
| 14 | 0.982 | 55° C. | Mg | 24.0 | Present | 2.42.E−03 | 5.06.E−04 |
| 15 | 0.980 | 56° C. | Ca | 4.5 | Present | 7.16.E−04 | 6.83.E−04 |
| 16 | 0.983 | 55° C. | Ca | 4.0 | Present | 1.56.E−03 | 5.81.E−04 |
| 17 | 0.982 | 55° C. | Ca | 4.3 | Present | 1.18.E−03 | 6.13.E−04 |
| 18 | 0.984 | 55° C. | Ca | 4.6 | Present | 1.67.E−03 | 5.93.E−04 |
| 19 | 0.984 | 56° C. | Ca | 4.1 | Present | 1.85.E−03 | 6.02.E−04 |
| 20 | 0.983 | 55° C. | Ca | 4.2 | Present | 1.54.E−03 | 5.61.E−04 |
| 21 | 0.982 | 55° C. | Ca | 4.2 | Present | 1.94.E−03 | 5.88.E−04 |
| 22 | 0.981 | 56° C. | Mg | 4.5 | Present | 1.68.E−03 | 6.10.E−04 |
| 23 | 0.949 | 57° C. | Ca | 4.5 | Present | 1.68.E−03 | 6.10.E−04 |
| 24 | 0.977 | 55° C. | Ca | 4.5 | Present | 6.26.E−02 | 6.90.E−04 |
| 25 | 0.983 | 55° C. | Ca | 4.4 | Present | 6.07.E−02 | 1.16.E−03 |
| 26 | 0.985 | 55° C. | Ca | 4.0 | Absent | 2.10.E−04 | 2.42.E−04 |
| 27 | 0.979 | 55° C. | Ca | 4.3 | Present | 1.53.E−03 | 7.93.E−04 |
| 28 | 0.977 | 57° C. | Ca | 4.1 | Absent | 1.52.E−04 | 7.98.E−05 |

In the tables, *1 denotes normalized intensity of silicon ions (m/z 28) in a time-of-flight secondary ion mass spectrometer (TOF-SIMS) for the respective toner particle. Further, *2 denotes normalized intensity of silicon ions (m/z 28) after sputtering the toner particle under condition (A) above.

The caption "Presence/absence of condensation" indicates whether or not the toner particle contained a condensation product of an organosilicon compound.

With regard to the normalized intensity, for instance, a statement of "2.11.E-03" indicates herein "$2.11 \times 10^{-3}$".

Production Example of Toner 1

Preparation of a Toner Particle Dispersion

Toner particle 1 was re-slurried with ion-exchanged water to obtain Toner particle dispersion 1 having a toner particle concentration of 20 mass %.

Addition of Fine Particles of a Polyhydric Acid Metal Salt

The materials below were weighed in a reaction vessel and were mixed using a propeller stirring blade.

| | |
|---|---|
| Sodium phosphate (dodecahydrate) | 0.9 parts |
| Titanium lactate (TC-310, by Matsumoto Fine Chemical Co., Ltd.) | 1.0 part |
| Toner particle dispersion 1 | 500.0 parts |

Next, the pH of the obtained mixed solution was adjusted to 7.0 and the temperature of the mixed solution was adjusted to 55° C., after which the mixed solution was held for 1 hour while being mixed using a propeller stirring blade.

Thereafter the pH was adjusted to 9.5 using a 1 mol/L NaOH aqueous solution, and the temperature was maintained at 50° C. for 2 hours while under stirring.

Then pH was adjusted to 1.5 using 1 mol/L hydrochloric acid, with stirring for 1 hour, followed by filtration while under washing with ion-exchanged water, and by drying, after which the obtained finely pulverized powder was classified using a multi-grade classifier relying on the Coanda effect to obtain Toner 1.

In a SEM observation, the number-average particle diameter of a titanium phosphate compound was 11 nm. A calculation of the abundance of the titanium phosphate compound by X-ray fluorescence yielded a result of 0.2 parts relative to 100 parts of the toner particle.

Table 4 sets out the physical properties of the obtained Toner 1.

Production Examples of Toners 2 to 5, 9 to 18, 21 to 31, 35 to 37, 39 and 40

Toners 2 to 5, 9 to 18, 21 to 31, 35 to 37, 39 and 40 were obtained in the same way as in the production example of Toner 1 except that the type of toner particle, the number of parts of the polyhydric acid source, and the type and number of parts of the metal source in the production example of Toner 1 were modified as given in Table 4. The amount of the fine particles of a polyhydric acid metal salt present on the surface of each obtained toner was as given in Table 4.

Table 4 sets out the physical properties of the obtained toners.

Production Example of Toner 6

Toner 6 was obtained by adding 0.5 parts of titanium oxide fine particles as a metal source to 100.0 parts of Toner particle 1, with mixing of the whole using FM mixer (by Nippon Coke & Engineering Co., Ltd.).

Table 4 sets out the physical properties of the obtained Toner 6.

Production Examples of Toners 7, 8, 32, 33 and 38

Toners 7, 8, 32, 33 and 38 were obtained in the same way as in the production example of Toner 6, except that the type and number of parts of toner particle and of the metal source were modified as given in Table 4.

Table 4 sets out the physical properties of the obtained toners.

Production Example of Toner 19

| | |
|---|---|
| Ion-exchanged water | 100.0 parts |
| Sodium sulfate | 4.8 parts |

The above were mixed and thereafter 10.0 parts of titanium lactate (TC-310, by Matsumoto Fine Chemical Co., Ltd.) were added, while under stirring at 13,000 rpm using T. K. Homomixer (by Tokushu Kika Kogyo Co., Ltd.) at room temperature. The pH was adjusted to 7.0 through addition of 1 mol/L hydrochloric acid.

A solid fraction was thereafter retrieved by centrifugation. Thereupon, the process of redispersing in ion-exchanged water and solid fraction retrieval by centrifugation was repeated three times, to remove ions such as sodium. The resulting product was dispersed again in ion-exchanged water and was dried by spray-drying, to yield Titanium sulfate compound fine particles 1 having a number-average particle diameter of 99 nm.

Then 0.5 parts of the Titanium sulfate compound fine particles 1 were added to 100.0 parts of Toner particle 1, and the whole was mixed using FM mixer (by Nippon Coke & Engineering Co., Ltd.) to yield Toner 19.

Table 4 sets out the physical properties of the obtained Toner 19.

Production Example of Toner 20

| | |
|---|---|
| Ion-exchanged water | 100.0 parts |
| Sodium carbonate | 3.6 parts |

The above were mixed and thereafter 10.0 parts of titanium lactate (TC-310, by Matsumoto Fine Chemical Co., Ltd.) were added, while under stirring at 13,000 rpm using T. K. Homomixer (by Tokushu Kika Kogyo Co., Ltd.) at room temperature. The pH was adjusted to 7.0 through addition of 1 mol/L hydrochloric acid.

Thereafter the solid fraction was retrieved by centrifugation. Thereupon, the process of redispersing in ion-exchanged water and solid fraction retrieval by centrifugation was repeated three times, to remove ions such as sodium. The resulting product was dispersed again in ion-exchanged water and was dried by spray-drying, to yield titanium carbonate compound fine particles 1 having a number-average particle diameter of 91 nm.

Then 0.5 parts of the titanium carbonate compound fine particles 1 were added to 100.0 parts of Toner particle 1, and the whole was mixed using FM mixer (by Nippon Coke & Engineering Co., Ltd.) to yield Toner 20.

Table 4 sets out the physical properties of the obtained Toner 20.

Production Example of Toner 34

Herein 0.5 parts of silicon dioxide were added to 100.0 parts of Toner particle 1, and the whole was mixed using FM mixer (by Nippon Coke & Engineering Co., Ltd.) to yield Toner 34.

humidity environment (25° C./50% RH) for 48 hours for the purpose of acclimation to the measurement environment.

Evaluation of Charge Retention Capability

Firstly, the potential difference between the charging blade and the charging roller was set to −400 V and an all-black image was outputted. The printer was stopped during image formation, the process cartridge was removed from the body, and the charge quantity of the toner on the photosensitive drum was evaluated using a charge quantity

TABLE 4

| | | Polyhydric acid source | | Metal source | | | |
|---|---|---|---|---|---|---|---|
| Toner No. | Toner particle | Type | Number of parts | Type | Number of parts | DA (nm) | X (parts) |
| 1 | Toner particle 1 | Sodium phosphate (dodecahydrate) | 0.9 | Titanium lactate | 1.0 | 11 | 0.2 |
| 2 | Toner particle 2 | Sodium phosphate (dodecahydrate) | 0.9 | Titanium lactate | 1.0 | 12 | 0.2 |
| 3 | Toner particle 3 | Sodium phosphate (dodecahydrate) | 0.9 | Titanium lactate | 1.0 | 12 | 0.2 |
| 4 | Toner particle 4 | Sodium phosphate (dodecahydrate) | 0.9 | Titanium lactate | 1.0 | 15 | 0.2 |
| 5 | Toner particle 1 | Sodium phosphate (dodecahydrate) | 0.9 | Aluminum lactate | 1.6 | 22 | 0.2 |
| 6 | Toner particle 1 | — | — | Titanium oxide | 0.5 | 28 | 0.5 |
| 7 | Toner particle 1 | — | — | Aluminum oxide | 0.5 | 15 | 0.5 |
| 8 | Toner particle 1 | — | — | Strontium titanate | 0.5 | 15 | 0.5 |
| 9 | Toner particle 5 | Sodium phosphate (dodecahydrate) | 0.9 | Titanium lactate | 1.0 | 13 | 0.2 |
| 10 | Toner particle 6 | Sodium phosphate (dodecahydrate) | 0.9 | Titanium lactate | 1.0 | 12 | 0.2 |
| 11 | Toner particle 7 | Sodium phosphate (dodecahydrate) | 0.9 | Titanium lactate | 1.0 | 11 | 0.2 |
| 12 | Toner particle 8 | Sodium phosphate (dodecahydrate) | 0.9 | Titanium lactate | 1.0 | 13 | 0.2 |
| 13 | Toner particle 9 | Sodium phosphate (dodecahydrate) | 0.9 | Titanium lactate | 1.0 | 16 | 0.2 |
| 14 | Toner particle 10 | Sodium phosphate (dodecahydrate) | 0.9 | Titanium lactate | 1.0 | 16 | 0.2 |
| 15 | Toner particle 11 | Sodium phosphate (dodecahydrate) | 0.9 | Titanium lactate | 1.0 | 15 | 0.2 |
| 16 | Toner particle 12 | Sodium phosphate (dodecahydrate) | 0.9 | Titanium lactate | 1.0 | 12 | 0.2 |
| 17 | Toner particle 13 | Sodium phosphate (dodecahydrate) | 0.9 | Titanium lactate | 1.0 | 11 | 0.2 |
| 18 | Toner particle 14 | Sodium phosphate (dodecahydrate) | 0.9 | Titanium lactate | 1.0 | 14 | 0.2 |
| 19 | Toner particle 1 | Sodium sulfate | — | Titanium lactate | — | 99 | 0.5 |
| 20 | Toner particle 1 | Sodium carbonate | — | Titanium lactate | — | 91 | 0.5 |
| 21 | Toner particle 15 | Sodium phosphate (dodecahydrate) | 0.9 | Titanium lactate | 1.0 | 13 | 0.2 |
| 22 | Toner particle 16 | Sodium phosphate (dodecahydrate) | 0.9 | Titanium lactate | 1.0 | 12 | 0.2 |
| 23 | Toner particle 17 | Sodium phosphate (dodecahydrate) | 0.9 | Titanium lactate | 1.0 | 11 | 0.2 |
| 24 | Toner particle 18 | Sodium phosphate (dodecahydrate) | 0.9 | Titanium lactate | 1.0 | 14 | 0.2 |
| 25 | Toner particle 19 | Sodium phosphate (dodecahydrate) | 0.9 | Titanium lactate | 1.0 | 12 | 0.2 |
| 26 | Toner particle 20 | Sodium phosphate (dodecahydrate) | 0.9 | Titanium lactate | 1.0 | 12 | 0.2 |
| 27 | Toner particle 21 | Sodium phosphate (dodecahydrate) | 0.9 | Titanium lactate | 1.0 | 11 | 0.2 |
| 28 | Toner particle 22 | Sodium phosphate (dodecahydrate) | 0.9 | Titanium lactate | 1.0 | 13 | 0.2 |
| 29 | Toner particle 23 | Sodium phosphate (dodecahydrate) | 0.9 | Titanium lactate | 1.0 | 11 | 0.2 |
| 30 | Toner particle 1 | Sodium phosphate (dodecahydrate) | 0.2 | Titanium lactate | 0.3 | 7 | 0.1 |
| 31 | Toner particle 1 | Sodium phosphate (dodecahydrate) | 18.0 | Titanium lactate | 10.0 | 183 | 2.8 |
| 32 | Toner particle 1 | — | — | Titanium oxide | 0.1 | 28 | 0.1 |
| 33 | Toner particle 1 | — | — | Titanium oxide | 5.0 | 28 | 5.0 |
| 34 | Toner particle 1 | — | — | — | — | — | — |
| 35 | Toner particle 24 | Sodium phosphate (dodecahydrate) | 0.9 | Titanium lactate | 1.0 | 14 | 0.2 |
| 36 | Toner particle 25 | Sodium phosphate (dodecahydrate) | 0.9 | Titanium lactate | 1.0 | 13 | 0.2 |
| 37 | Toner particle 26 | Sodium phosphate (dodecahydrate) | 0.9 | Titanium lactate | 1.0 | 13 | 0.2 |
| 38 | Toner particle 26 | — | — | Titanium oxide | 0.5 | 28 | 0.5 |
| 39 | Toner particle 27 | Sodium phosphate (dodecahydrate) | 0.9 | Titanium lactate | 1.0 | 14 | 0.2 |
| 40 | Toner particle 28 | Sodium phosphate (dodecahydrate) | 0.9 | Titanium lactate | 1.0 | 14 | 0.2 |

In the table, DA denotes the number-average particle diameter of fine particles of a polyhydric acid metal salt. Further, X denotes the amount of fine particles of a polyhydric acid metal salt relative to 100 parts of toner particle.

Example 1

An electrophotographic apparatus was prepared first in the form of a modified laser beam printer LBP652C by Canon Inc. The printer was modified to be connected to an external high-voltage power supply, and to provide an arbitrary potential difference between a charging blade and a charging roller; further, process speed was set to 200 mm/sec.

Next, a process cartridge filled with Toner 1 as the cartridge for LBP652C and the electrophotographic device were allowed to stand in a normal-temperature and normal-distribution measuring device E-SPART Analyzer EST-1 (by Hosokawa Micron Corporation).

Charge retention capability was evaluated by comparing the charge quantity on a developing roller in the evaluation of charge injection capability above and the charge quantity on the photosensitive drum in the present evaluation.

In the present evaluation, the higher the charge retention capability, the unlikelier becomes leakage of charge in a developing step, and thus a higher charge quantity is maintained as a result. That is, the smaller the evaluated numerical value, the better is the charge retention capability.

The evaluation results of Example 1 are given in Table 5.

Charge Retention Capability

A: difference between charge quantity on the developing roller and on the photosensitive drum of 3 μC/g or less B: difference between charge quantity on the developing roller and on the photosensitive drum of larger than 3 μC/g and up to 6 μC/g C: difference between charge quantity on the developing roller and on the photosensitive drum of larger than 6 μC/g and up to 10 μC/g D: difference between charge quantity on the developing roller and on the photosensitive drum of larger than 10 μC/g Charge Injection Capability (Injection Charge Quantity)

Firstly, a potential difference between the charging blade and the charging roller was set to 0 V, and an all-white image was outputted. The printer was stopped during image formation, the process cartridge was removed from the body, and the charge quantity and charge quantity distribution of the toner on the developing roller were evaluated using a charge quantity distribution measuring device E-SPART Analyzer EST-1 (by Hosokawa Micron Corporation).

Next, the potential difference between the charging blade and the charging roller was set to −400 V, and the same evaluation was carried out.

An injection charge quantity and an injection charge quantity distribution were evaluated on the basis of the change ΔQ/M (units μC/g) in charge quantity and the change in the charge quantity distribution when the potential difference was 0 V and −400 V.

The evaluation criteria for the charge quantity distribution was how many multiples the half width of a charge quantity distribution for −400 V was relative to the half width of the charge quantity distribution for 0 V.

Under this criterion, a smaller multiple denotes a sharper charge quantity distribution and a superior charging state.

In the present evaluation, the higher the charge injection capability, the greater becomes the change in charge quantity for potential difference, and accordingly the greater becomes the charge quantity difference (ΔQ/M). At the same time, it becomes possible to achieve a uniform charge quantity distribution, which is one characteristic of superior injection charging.

The evaluation results of Example 1 are given in Table 5.

Charge Injection Capability

A: ΔQ/M of larger than 20 μC/g

B: ΔQ/M of larger than 10 μC/g and up to 20 μC/g

C: ΔQ/M of larger than 5 μC/g and up to 10 μC/g

D: ΔQ/M of 5 μC/g or less

Injection Charge Quantity Distribution

A: the half width of the charge quantity distribution for −400 V is 0.70 times or less that for 0 V B: the half width of the charge quantity distribution for −400 V is more than 0.70 times and up to 0.80 times compared to that for 0 V C: the half width of the charge quantity distribution for −400 V is more than 0.80 times and up to 0.90 times compared to that for 0 V D: the half width of the charge quantity distribution for −400 V is larger than 0.90 times compared to that for 0 V Evaluation of Charge Injection Capability (Injection Charge Quantity) at Low Voltage An evaluation was performed under similar conditions to those the above evaluation of charge injection capability, except that the potential difference between the charging blade and the charging roller was modified to −200 V.

The injection charge quantity and injection charge quantity distribution were evaluated on the basis of the change ΔQ/M (units μC/g) in charge quantity and the change in the charge quantity distribution when the potential difference was 0 V and −200 V.

In the present evaluation, the greater the difference ΔQ/M (units μC/g) in charge quantity between instances of potential difference of 0 V and −200 V, the better is charge injection capability that is denoted thereby and the higher is the charge quantity even at low voltage.

The evaluation results of Example 1 are given in Table 5.

Charge Injection Capability at Low Voltage

A: ΔQ/M of larger than 20 μC/g

B: ΔQ/M of larger than 10 μC/g and up to 20 μC/g

C: ΔQ/M of larger than 5 μC/g and up to 10 μC/g

D: ΔQ/M of 5 μC/g or less

Examples 2 to 40, Comparative Examples 1 to 6

Evaluations were carried out in the same way as in Example 1, except that the filling toner was modified as given in Table 5. The evaluation results are given in Table 5.

TABLE 5

| | | Charge retention capability | | Injection charge quantity (400 V) | | | Injection charge quantity distribution | | Injection charge quantity (200 V) | | |
|---|---|---|---|---|---|---|---|---|---|---|---|
| | Toner No. | Charge quantity difference (μC/g) | Evaluation | Charge quantity at 400 V (μC/g) | ΔQ/M (μC/g) | Evaluation | Half width (multiples) | Evaluation | Charge quantity at 200 V (μC/g) | ΔQ/M' (μC/g) | Evaluation |
| Example 1 | 1 | 1 | A | −46 | 25 | A | 0.67 | A | −40 | 19 | B |
| Example 2 | 2 | 1 | A | −40 | 18 | B | 0.79 | B | −34 | 12 | B |
| Example 3 | 3 | 6 | B | −45 | 23 | A | 0.69 | A | −39 | 17 | B |
| Example 4 | 4 | 1 | A | −45 | 25 | A | 0.69 | A | −39 | 19 | B |
| Example 5 | 5 | 2 | A | −41 | 23 | A | 0.76 | B | −35 | 17 | B |
| Example 6 | 6 | 3 | A | −36 | 21 | A | 0.76 | B | −30 | 15 | B |
| Example 7 | 7 | 3 | A | −38 | 22 | A | 0.79 | B | −31 | 15 | B |
| Example 8 | 8 | 2 | A | −38 | 22 | A | 0.79 | B | −30 | 14 | B |
| Example 9 | 9 | 1 | A | −49 | 28 | A | 0.65 | A | −44 | 23 | A |
| Example 10 | 10 | 2 | A | −41 | 19 | B | 0.77 | B | −33 | 11 | B |
| Example 11 | 11 | 4 | B | −44 | 24 | A | 0.65 | A | −38 | 18 | B |
| Example 12 | 12 | 6 | B | −42 | 23 | A | 0.65 | A | −39 | 20 | B |
| Example 13 | 13 | 2 | A | −46 | 23 | A | 0.69 | A | −40 | 17 | B |
| Example 14 | 14 | 1 | A | −46 | 22 | A | 0.69 | A | −39 | 15 | B |
| Example 15 | 15 | 3 | A | −47 | 25 | A | 0.67 | A | −41 | 19 | B |
| Example 16 | 16 | 3 | A | −47 | 24 | A | 0.70 | A | −42 | 19 | B |
| Example 17 | 17 | 6 | B | −45 | 24 | A | 0.78 | B | −38 | 17 | B |
| Example 18 | 18 | 7 | C | −43 | 21 | A | 0.85 | C | −35 | 13 | B |
| Example 19 | 19 | 2 | A | −38 | 17 | B | 0.74 | B | −32 | 11 | B |

TABLE 5-continued

| | | Charge retention capability | | Injection charge quantity (400 V) | | | Injection charge quantity distribution | | Injection charge quantity (200 V) | | |
|---|---|---|---|---|---|---|---|---|---|---|---|
| | Toner No. | Charge quantity difference (μC/g) | Evaluation | Charge quantity at 400 V (μC/g) | ΔQ/M (μC/g) | Evaluation | Half width (multiples) | Evaluation | Charge quantity at 200 V (μC/g) | ΔQ/M' (μC/g) | Evaluation |
| Example 20 | 20 | 2 | A | −35 | 16 | B | 0.72 | B | −30 | 11 | B |
| Example 21 | 21 | 2 | A | −40 | 18 | B | 0.79 | B | −36 | 14 | B |
| Example 22 | 22 | 2 | A | −52 | 26 | A | 0.69 | A | −46 | 20 | B |
| Example 23 | 23 | 3 | A | −53 | 27 | A | 0.70 | A | −47 | 21 | A |
| Example 24 | 24 | 1 | A | −53 | 29 | A | 0.65 | A | −49 | 25 | A |
| Example 25 | 25 | 1 | A | −52 | 29 | A | 0.68 | A | −48 | 23 | A |
| Example 26 | 26 | 1 | A | −54 | 28 | A | 0.69 | A | −48 | 22 | A |
| Example 27 | 27 | 2 | A | −56 | 29 | A | 0.69 | A | −52 | 25 | A |
| Example 28 | 28 | 5 | B | −45 | 23 | A | 0.68 | A | −41 | 19 | B |
| Example 29 | 29 | 6 | B | −41 | 23 | A | 0.67 | A | −35 | 17 | B |
| Example 30 | 30 | 2 | A | −46 | 22 | A | 0.78 | B | −42 | 18 | B |
| Example 31 | 31 | 6 | B | −42 | 23 | A | 0.68 | A | −35 | 16 | B |
| Example 32 | 32 | 2 | A | −46 | 25 | A | 0.79 | B | −39 | 18 | B |
| Example 33 | 33 | 6 | B | −44 | 24 | A | 0.69 | A | −39 | 19 | B |
| Comparative example 1 | 34 | 4 | B | −33 | 3 | D | 0.91 | D | −31 | 1 | D |
| Comparative example 2 | 35 | 13 | D | −51 | 26 | A | 0.88 | C | −44 | 19 | B |
| Comparative example 3 | 36 | 15 | D | −56 | 31 | A | 0.72 | B | −52 | 27 | A |
| Comparative example 4 | 37 | 5 | B | −37 | 9 | C | 0.73 | B | −30 | 2 | D |
| Comparative example 5 | 38 | 4 | B | −31 | 4 | D | 0.98 | D | −29 | 2 | D |
| Comparative example 6 | 39 | 12 | D | −46 | 25 | A | 0.65 | A | −40 | 19 | B |
| Comparative example 7 | 40 | 9 | C | −30 | 3 | D | 0.91 | D | −40 | 1 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-178438, filed Oct. 23, 2020, which is hereby incorporated by reference herein in its entirety.

What is claimed is:

1. A toner comprising a toner particle comprising a binder resin, wherein the toner particle comprises a condensation product of an organosilicon compound, in time-of-flight secondary ion mass spectrometry TOF-SIMS of the toner particle, a normalized intensity of silicon ions (m/z 28) derived from the condensation product of the organosilicon compound, which is given by Expression (I) below, is from $7.00\times10^{-4}$ to $3.00\times10^{-2}$;

Silicon ion normalized intensity(m/z 28)={ion intensity(m/z 28) of silicon ions}/{total ion intensity of m/z from 0.5 to 1850} (I), a normalized intensity of silicon ions (m/z 28) by time-of-flight secondary ion mass spectrometry after sputtering the toner particle by an Ar gas cluster ion beam Ar-GCIB under condition (A) below is $6.99\times10^{-4}$ or lower;

(A) acceleration voltage: 5 kV, current: 6.5 nA, raster size: 600×600 μm, irradiation time: 5 sec/cycle, sputtering time: 250 sec, the toner comprises a fine particle on the surface of the toner particle, and the fine particle has at least one selected from the group consisting of fine particle of a polyhydric acid metal salt, which is a reaction product of a compound comprising at least one of Ti and Al elements and a polyhydric acid, a strontium titanate fine particle, a titanium oxide fine particle and an aluminum oxide fine particle.

2. The toner according to claim 1, wherein the normalized intensity of silicon ions (m/z 28) of the toner particle is from $7.00\times10^{-4}$ to $8.00\times10^{-3}$, and the normalized intensity of silicon ions (m/z 28) by time-of-flight secondary ion mass spectrometry after sputtering the toner particle under the condition (A) is $6.00\times10^{-4}$ or lower.

3. The toner according to claim 1, wherein the fine particle is a fine particle of a polyhydric acid metal salt which is a reaction product of a compound comprising at least one of Ti and Al elements and a polyhydric acid.

4. The toner according to claim 3, wherein the polyhydric acid of the fine particle of a polyhydric acid metal salt is phosphoric acid.

5. The toner according to claim 3, wherein a metal element in the fine particle of a polyhydric acid metal salt is Ti.

6. The toner according to claim 1, wherein the total content of Ca and Mg elements in the toner particle is 23 μmol/g or less, as measured by an inductively coupled plasma atomic emission spectrometer.

7. The toner according to claim 1, wherein the condensation product of the organosilicon compound is a silane-modified resin R having the structure represented by Formula (1) below;

(1)

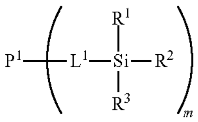

in Formula (1), $P^1$ represents a polymer segment; L1 represents a single bond or a divalent linking group; $R^1$ to $R^3$ each independently represents a hydrogen atom, a halogen atom, an alkyl group having 1 or more carbon atoms, an alkoxy group having 1 or more carbon atoms, an aryl group having 6 or more carbon atoms, or a hydroxy group; and m represents a positive integer; in a case where m is equal to or greater than 2, a plurality of $L^1$, a plurality of $R^1$, a plurality of $R^2$ and a plurality of $R^3$ may be respectively identical or different; however, Si is bonded to at least one carbon, and at least one of $R^1$ to $R^3$ is condensed with an organosilicon compound.

8. The toner according to claim 7, wherein at least one of the $R^1$ to $R^3$ represents an alkoxy group having 1 or more carbon atoms, or a hydroxy group.

9. The toner according to claim 7, wherein groups in the $R^1$ to $R^3$ which are not condensed with the organosilicon compound each independently represent an alkoxy group having 1 or more carbon atoms, or a hydroxy group.

10. The toner according to claim 7, wherein the $P^1$ represents a styrene acrylic resin segment or a polyester resin segment.

11. The toner according to claim 7, wherein the $L^1$ is represented by Formula (2) below;

(2)

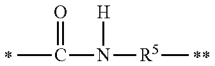

in Formula (2), $R^5$ represents a single bond, an alkylene group or an arylene group; (*) represents a binding segment to $P^1$ of Formula (1); and (**) represents a binding segment to the silicon atom in the Formula (1).

12. The toner according to claim 1, wherein the content of the fine particle is from 0.10 parts by mass to 0.30 parts by mass relative to 100 parts by mass of the toner particle.

13. The toner according to claim 1, wherein a number-average particle diameter DA of the fine particle of a polyhydric acid metal salt is from 5 nm to 30 nm.

* * * * *